(12) United States Patent
Son et al.

(10) Patent No.: US 6,741,748 B1
(45) Date of Patent: May 25, 2004

(54) SCAN INTERLEAVING METHOD BASED ON CONTEXT VALUES OF NEIGHBORING PIXELS, IMPROVED ENCODING/DECODING METHOD OF BINARY SHAPE DATA AND ENCODING/DECODING APPARATUS SUITABLE FOR THE SAME

(75) Inventors: Se-hoon Son, Seoul (KR); Euee-seon Jang, Sungnam (KR); Jae-seob Shin, Seoul (KR)

(73) Assignee: Samsung Electronics Co., Suwon-Si (KR)

( * ) Notice: Subject to any disclaimer, the term of this patent is extended or adjusted under 35 U.S.C. 154(b) by 0 days.

(21) Appl. No.: 09/429,018

(22) Filed: Oct. 29, 1999

Related U.S. Application Data

(63) Continuation-in-part of application No. 09/045,867, filed on Mar. 23, 1998, now Pat. No. 6,240,212.

(30) Foreign Application Priority Data

Jun. 19, 1997 (KR) .............................................. 97-25784

(51) Int. Cl.⁷ ................................................. G06K 9/36
(52) U.S. Cl. ....................................... 382/243; 382/239
(58) Field of Search ................................ 382/243, 240, 382/236, 233, 239, 238, 247, 244; 348/416, 390.1, 391.1

(56) References Cited

U.S. PATENT DOCUMENTS

| | | | | |
|---|---|---|---|---|
| 6,057,884 A | * | 5/2000 | Chen et al. .................. | 348/416 |
| 6,198,508 B1 | * | 3/2001 | Jang et al. ................ | 348/391.1 |
| 6,259,738 B1 | * | 7/2001 | Yamaguchi et al. ......... | 382/243 |
| 6,295,381 B1 | * | 9/2001 | Katata et al. ............... | 382/240 |

FOREIGN PATENT DOCUMENTS

EP 0607484 A1 7/1994

OTHER PUBLICATIONS

Bossen et al., "A Simple and Efficient Binary Shape Coding Technique Based on Bitmap Representation," 1997 *Institute of Electrical and Electronics Engineers*, Apr. 21, 1997, pp. 3129–3132.
Ebrahimi, Touradj, "MPEG–4 video verification model: A video encoding/decoding algorithm based on content representation," *Signal Processing: Image Communication*, 1997, pp. 367–384.
Lee et al., "An Efficient Encoding of DCT Blocks with Block–Adaptive Scanning," *IEICE Transactions on Communications*, vol. E77–B, No. 12, Dec. 1994, pp. 1489–1494.

* cited by examiner

*Primary Examiner*—Cheukfan Lee
(74) *Attorney, Agent, or Firm*—Burns, Doane, Swecker & Mathis, L.L.P.

(57) ABSTRACT

There are provided an improved scan interleaving method based on context values of neighboring pixels, an improved binary shape encoding/decoding method, and encoding/decoding apparatus suitable for the same. The hierarchical binary shape encoding apparatus includes a portion for down-sampling for SI method, the portion for performing down-sampling for SI method on the binary shape data to form a base layer, a portion for encoding the base layer supplied from the down-sampling portion, and a portion for encoding an enhancement layer having the current binary shape data by referring to the base layer or a preceding frame. The encoding apparatus can perform hierarchical encoding, thereby enhancing the overall coding efficiency.

41 Claims, 22 Drawing Sheets

→ PROCESSED FIRST
---→ PROCESSED SECOND

FIG. 13A

| 64 | 65 | 66 | 67 | 68 | 69 | 70 | 71 | 72 | 73 | 74 | 75 | 76 | 77 | 78 | 79 |
|----|----|----|----|----|----|----|----|----|----|----|----|----|----|----|----|
| 0 | R | 8 | R | 16 | R | 24 | R | 32 | R | 40 | R | 48 | R | 56 | R |
| 80 | 81 | 82 | 83 | 84 | 85 | 86 | 87 | 88 | 89 | 90 | 91 | 92 | 93 | 94 | 95 |
| 1 | R | 9 | R | 17 | R | 25 | R | 33 | R | 41 | R | 49 | R | 57 | R |
| 96 | 97 | 98 | 99 | 100 | 101 | 102 | 103 | 104 | 105 | 106 | 107 | 105 | 109 | 110 | 111 |
| 2 | R | 10 | R | 18 | R | 26 | R | 34 | R | 42 | R | 50 | R | 58 | R |
| 112 | 113 | 114 | 115 | 116 | 117 | 118 | 119 | 120 | 121 | 122 | 123 | 124 | 125 | 126 | 127 |
| 3 | R | 11 | R | 19 | R | 27 | R | 35 | R | 43 | R | 51 | R | 59 | R |
| 128 | 129 | 130 | 131 | 132 | 133 | 134 | 135 | 136 | 137 | 138 | 139 | 140 | 141 | 142 | 143 |
| 4 | R | 12 | R | 20 | R | 28 | R | 36 | R | 44 | R | 52 | R | 60 | R |
| 144 | 145 | 146 | 147 | 148 | 149 | 150 | 151 | 152 | 153 | 154 | 155 | 156 | 157 | 158 | 159 |
| 5 | R | 13 | R | 21 | R | 29 | R | 37 | R | 45 | R | 53 | R | 61 | R |
| 160 | 161 | 162 | 163 | 164 | 165 | 166 | 167 | 168 | 169 | 170 | 171 | 172 | 173 | 174 | 175 |
| 6 | R | 14 | R | 22 | R | 30 | R | 38 | R | 46 | R | 54 | R | 62 | R |
| 176 | 177 | 178 | 179 | 180 | 181 | 182 | 183 | 184 | 185 | 186 | 187 | 188 | 189 | 190 | 191 |
| 7 | R | 15 | R | 23 | R | 31 | R | 39 | R | 47 | R | 55 | R | 63 | R |

FIG. 13B

| 64 | 0 | 80 | 1 | 96 | 2 | 112 | 3 | 128 | 4 | 144 | 5 | 160 | 6 | 176 | 7 |
|----|---|----|----|----|----|-----|----|-----|----|-----|----|-----|----|-----|----|
| 65 | R | 81 | R | 97 | R | 113 | R | 129 | R | 145 | R | 161 | R | 177 | R |
| 66 | 8 | 82 | 9 | 98 | 10 | 114 | 11 | 130 | 12 | 146 | 13 | 162 | 14 | 178 | 15 |
| 67 | R | 83 | R | 99 | R | 115 | R | 131 | R | 147 | R | 163 | R | 179 | R |
| 68 | 16 | 84 | 17 | 100 | 18 | 116 | 19 | 132 | 20 | 148 | 21 | 164 | 22 | 180 | 23 |
| 69 | R | 85 | R | 101 | R | 117 | R | 133 | R | 149 | R | 165 | R | 181 | R |
| 70 | 24 | 86 | 25 | 102 | 26 | 118 | 27 | 134 | 28 | 150 | 29 | 166 | 30 | 182 | 31 |
| 71 | R | 87 | R | 103 | R | 119 | R | 135 | R | 151 | R | 167 | R | 183 | R |
| 72 | 32 | 88 | 33 | 104 | 34 | 120 | 35 | 136 | 36 | 152 | 37 | 168 | 38 | 184 | 39 |
| 73 | R | 89 | R | 105 | R | 121 | R | 137 | R | 153 | R | 169 | R | 185 | R |
| 74 | 40 | 90 | 41 | 106 | 42 | 122 | 43 | 138 | 44 | 154 | 45 | 170 | 46 | 186 | 47 |
| 75 | R | 91 | R | 107 | R | 123 | R | 139 | R | 155 | R | 171 | R | 187 | R |
| 76 | 48 | 92 | 49 | 105 | 50 | 124 | 51 | 140 | 52 | 156 | 53 | 172 | 54 | 188 | 55 |
| 77 | R | 93 | R | 109 | R | 125 | R | 141 | R | 157 | R | 173 | R | 189 | R |
| 78 | 56 | 94 | 57 | 110 | 58 | 126 | 59 | 142 | 60 | 158 | 61 | 174 | 62 | 190 | 63 |
| 79 | R | 95 | R | 111 | R | 127 | R | 143 | R | 159 | R | 175 | R | 191 | R |

FIG. 15A
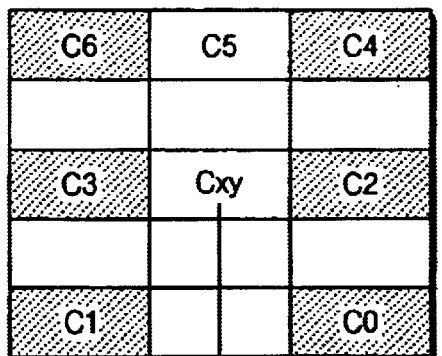
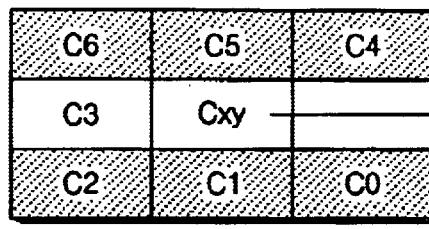
ENCODING/DECODING OF SCANNING PIXELS 0~63 USING NEIGHBORING PIXEL
ENCODING/DECODING OF SCANNING PIXELS 64~191 USING NEIGHBORING PIXEL
SCANNING DIRECTION
FIG. 15B
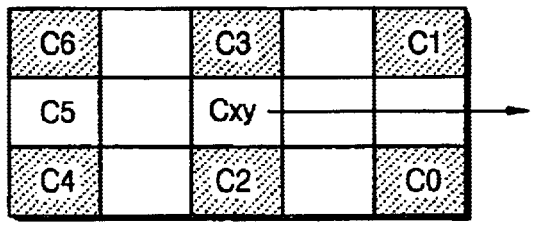
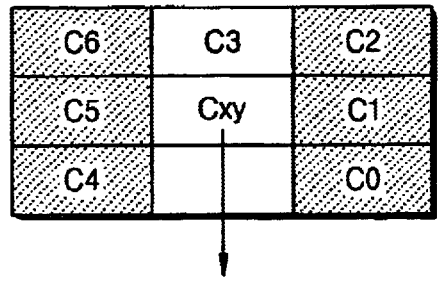
ENCODING/DECODING OF SCANNING PIXELS 0~63 USING NEIGHBORING PIXEL
ENCODING/DECODING OF SCANNING PIXELS 64~191 USING NEIGHBORING PIXEL

SCAN INTERLEAVING METHOD BASED ON CONTEXT VALUES OF NEIGHBORING PIXELS, IMPROVED ENCODING/ DECODING METHOD OF BINARY SHAPE DATA AND ENCODING/DECODING APPARATUS SUITABLE FOR THE SAME

CROSS REFERENCE TO RELATED APPLICATION DATA

This application claims priority under 35 U.S.C. §§119 and/or 365 to 97-25784 filed in Korea on Jun. 19, 1997; the entire content of which is hereby incorporated by reference.

This is a continuation-in-part of patent application Ser. No. 09/045,867, filed by the applicant of the present invention on Mar. 23, 1998, U.S. Pat. No. 6,240,212.

BACKGROUND OF THE INVENTION

1. Field of the Invention

The present invention relates to an improved scan interleaving method based on context values of neighboring pixels, an improved binary shape encoding/decoding method, and an encoding/decoding apparatus suitable for the same.

2. Description of the Related Art

Scan interleaving methods, which are used to encode/ decode binary images require multipurpose encoding/ decoding functions such as adjustment of resolution or image quality, encoding/decoding to resist transmission errors, or transmission rate adjustment.

FIG. 1 illustrates a conventional concept of an encoder and a decoder. In FIG. 1, a shape encoder 11 encodes input shape data, and sends an encoded bit stream 13 to a shape decoder 15. The shape decoder 15 restores the shape data from the transmitted bit stream.

However, in consideration of the resolution or image quality of a shape to be encoded, the shape encoder 11 shown in FIG. 1 generates a great number of bits by performing encoding, thus increasing system complexity. This problem becomes serious in multipurpose encoding/ decoding of binary images in the video communications field in which various additional functions such as adjustment of resolution or image quality, encoding/decoding to resist transmission errors, or transmission rate adjustment are required.

To overcome this problem, a so-called scan interleaving method is used, in which a pixel of a current scanning line is encoded/decoded through an XOR operation by referring to the immediately preceding and succeeding scanning lines of the current scanning line.

According to the scan interleaving (SI) method, if the pixel of the current scanning line and those of the immediately preceding and succeeding scanning lines of the current scanning line are all the same value, the current pixel is not encoded. The current pixel is only encoded when they are different from one another. In order to determine whether the pixel of the current scanning line and those of the immediately preceding and succeeding scanning lines of the current scanning line are all the same value, an XOR operation is performed.

FIG. 2 is a view for illustrating a conventional scan interleaving method. In FIG. 2, reference numeral 200 denotes original shape data, reference numeral 210 denotes base image data, and reference numeral 220 denotes object image data to be scan-interleaved.

The base image data is composed of pixels on odd (or even) numbered scanning lines among pixels forming the original shape data 200.

The object image data 220 is composed of pixels on even (or odd) numbered scanning lines among the pixels forming the original shape data 200, and includes transitional sample data (TSD) and exceptional sample data (ESD), and predictive sample data (PSD).

The TSD, which are denoted by squares, indicate pixels for which the pixel on a current scanning line is the same as only one of the corresponding pixels on the preceding and succeeding scanning lines as shown in the object image data 220 of FIG. 2. For example, the third pixel from the left on the first scanning line of the object image data 220 is different to only one of the third pixels from the left on the first and second scanning lines of the base image data 210. Thus, the TSD in this case is "1". This is obtained by performing an XOR operation on the pixel on the current scanning line with the corresponding pixel on the preceding line, then, an XOR operation on the pixel of the current line with the corresponding pixel of the succeeding line, and finally an XOR operation on the two XOR results.

The ESD, which are denoted by circles, indicate pixels for which the pixel on the current scanning line is different to both of the corresponding pixels on the preceding and succeeding scanning lines as shown in the object image data 240 of FIG. 2. For example, the third pixel from the right of the first scanning line in the object image data 220 is different to both of the third pixels from the right of the first and second scanning lines in the base image data 210. Thus, the ESD in this case is "0" by performing an XOR operation on the third pixel from the right on the current scanning line with the corresponding pixel on the preceding line, then, an XOR operation on the pixel on the current line with the corresponding pixel on the succeeding line, and finally an XOR operation on the two XOR results.

The PSD are all the pixels except the TSD (230) and the ESD (240) pixels in the object image data (220).

In the scan interleaving method, the base image data is independently encoded from the object image data. In encoding the object image data, a pixel context value is determined by the condition of adjacent pixels, and the object image data is entropy-encoded based on a probability model dependent on pixel context value.

The ESD is divided into continuous data and noncontinuous data, and then encoded. In the latter, the pixel prediction probability of the context and the occurrence run of the value of the ESD are entropy-encoded.

In the former, the pixel prediction probability of the context and the continuous segments of the first data value of the successive ESD are encoded.

However, the conventional scan interleaving method performs TSD encoding and ESD encoding in two separate steps, thus increasing the algorithm complexity and making implementation difficult.

In addition, the overall encoding performance is decreased due to encoding the ESD.

SUMMARY OF THE INVENTION

To solve the above problems, it is a first object of the present invention to provide an improved scan interleaving method for selectively encoding a part or the whole of object image data according to presence or absence of ESD.

It is a second object of the present invention to provide an improved scan interleaving method for increasing the overall coding efficiency by determining an optimum scan interleaving direction.

It is a third object of the present invention to provide a hierarchical binary shape encoding method.

It is a fourth object of the present invention to provide an encoding apparatus suitable for the hierarchical binary shape encoding method.

It is a fifth object of the present invention to provide a hierarchical binary shape decoding method.

It is a sixth object of the present invention to provide a decoding apparatus suitable for the hierarchical binary shape decoding method.

To achieve the above first object, there is provided a scan interleaving method for obtaining base image data and object image data to be encoded including TSD, ESD and PSD by scan-interleaving binary image data, and encoding the obtained base image data, and object image data which includes TSD, ESD and PSD, including the steps of (a) receiving the binary image data, (b) scan-interleaving the received binary image data, (c) obtaining the base image data from the scan-interleaving result, (d) obtaining the object image data from the scan-interleaving result, (e) encoding the base image data obtained in said step (d), (f) determining whether the object image data obtained in said steps (a) through (e) includes ESD, (g) encoding TSD only when there is no ESD, and (h) encoding TSD, ESD and PSD when there is ESD.

To achieve the second object, there is provided a scan interleaving method for obtaining base image data and object image data including TSD, ESD and PSD by scan-interleaving binary image data, and encoding the obtained base image data, and TSD, ESD and PSD, including the steps of (a') receiving the binary image data, (b') determining a scan interleaving direction for the received binary image data, (c') scan interleaving the received binary data in the determined scan interleaving direction, (d') obtaining the base image data from the scan-interleaving result, (e') obtaining the object image data from the scan-interleaving result, (f') encoding the base image data obtained in step (d'), (g') determining whether the object image data includes ESD, (h') encoding TSD only when there is no ESD, and (i') encoding the TSD and ESD when there is ESD.

To achieve the third object, there is provided a hierarchical binary shape encoding method including the steps of retrieving a base layer from the current binary shape data, encoding the base layer by an arbitrary encoding method, and encoding an enhancement layer having the current binary shape data by referring to the base layer or a preceding frame.

To achieve the fourth object, there is provided an apparatus for encoding binary shape data including a portion for down-sampling for SI method, the portion for performing down-sampling for SI method on the binary shape data to form a base layer, a portion for encoding the base layer supplied from the down-sampling portion, and a portion for encoding an enhancement layer having the current binary shape data by referring to the base layer or a preceding frame.

To achieve the fifth object, there is provided a method for decoding binary shape data having a base layer bitstream and an enhancement layer bitstream including the steps of decoding the base layer from the base layer bitstream, performing up-sampling for SI method on the base layer restored in the base layer decoding step, decoding an enhancement layer from the enhancement layer bitstream by referring to the base layer or the preceding frame, and determining whether restoration of additional spatial layers is necessary, and if necessary, and applying the shape data as restored to the up-sampling step for the purpose of referring to the same in the decoding step of the next enhancement layer.

To achieve the sixth object, there is provided an apparatus for decoding binary shape data having a base layer bitstream and an enhancement layer bitstream, including a base layer decoding portion for decoding the base layer from the base layer bitstream, an up-sampling portion for performing up-sampling for SI method on the base layer restored by the base layer decoding portion, decoding an enhancement layer from the enhancement layer bitstream by referring to the base layer or the preceding frame, and an enhancement layer decoding portion for decoding an enhancement layer from the enhancement layer bitstream.

BRIEF DESCRIPTION OF THE DRAWINGS

The above objects and advantages of the present invention will become more apparent by describing in detail preferred embodiments thereof with reference to the attached drawings in which:

FIGS. 13A and 13B schematically show V-H SI scanning and H-V SI scanning, respectively;

FIGS. 15A and 15B are flowcharts showing SI block pixel encoding and decoding operations, respectively;

DESCRIPTION OF THE PREFERRED EMBODIMENTS

Figure 3:
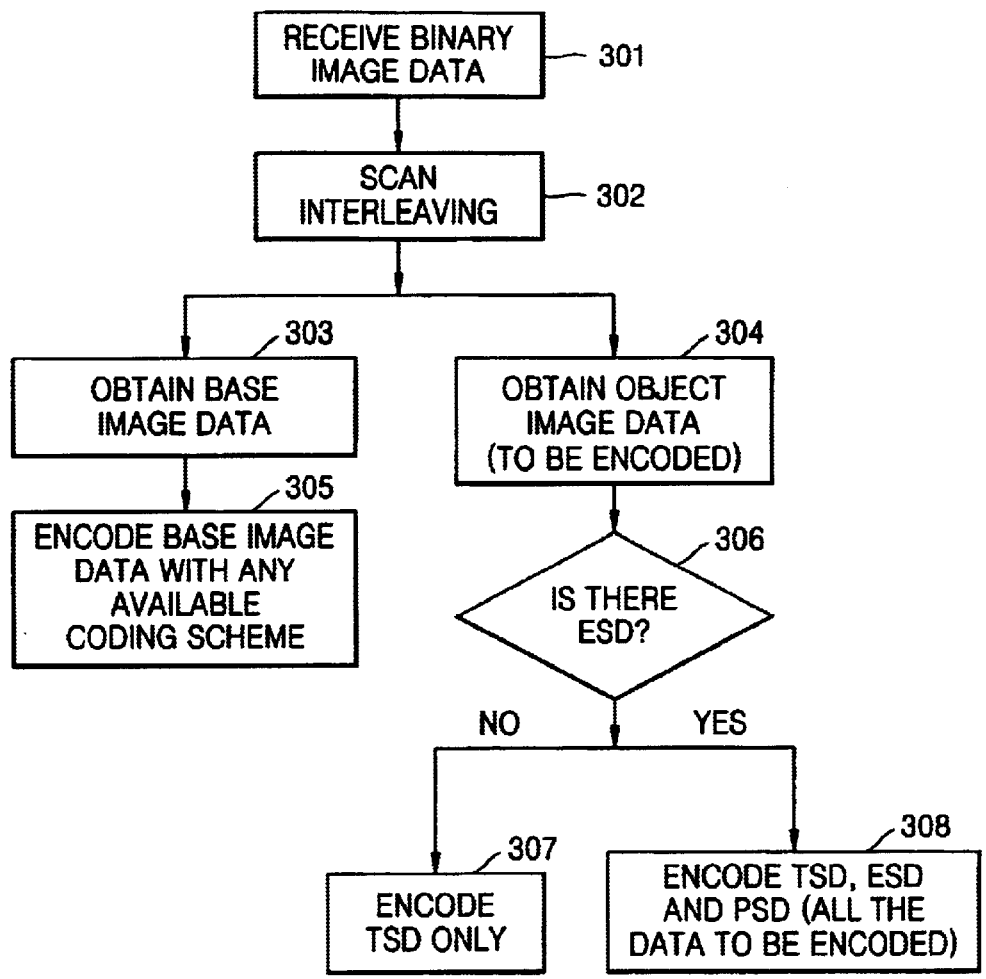
FIG. 3 is a flowchart of a scan interleaving method according to an embodiment of the present invention.

The method shown in FIG. 3 includes the steps of: (301) receiving binary image data; (302) scan-interleaving the received binary image data; (303) obtaining base image data from the scan-interleaved result; (304) obtaining object image data from the scan-interleaved result; (305) encoding the base image data obtained in step (303); (306) determining whether the object image data obtained in step (304) has ESD; (307) encoding TSD when there is no ESD; and (308) encoding the TSD, ESD and PSD when there is the ESD.

The scan interleaving method shown in FIG. 3 will be described.

In step (301), binary image data is received.

Figure 1:
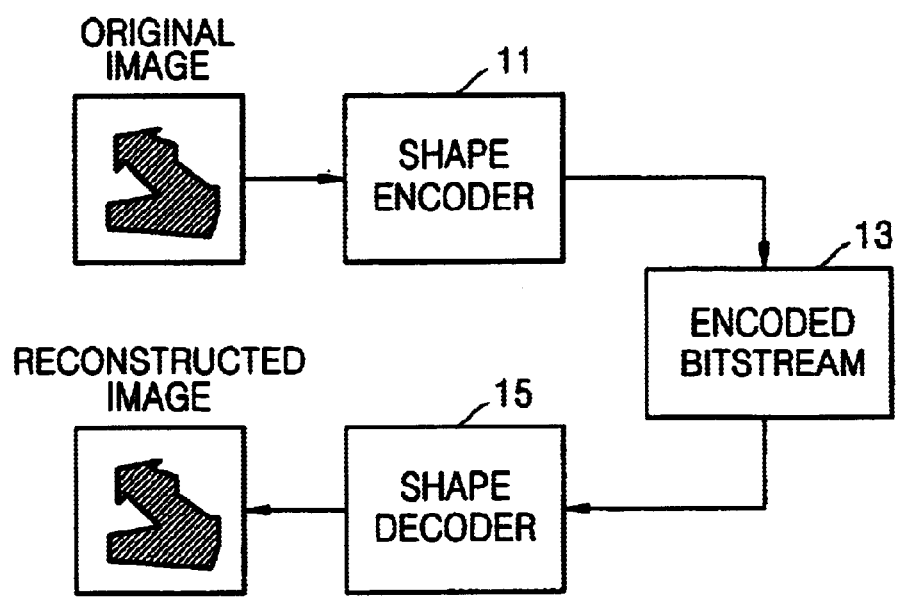
FIG. 1 is a conceptual diagram of a conventional shape encoder and shape decoder.
Figure 2:
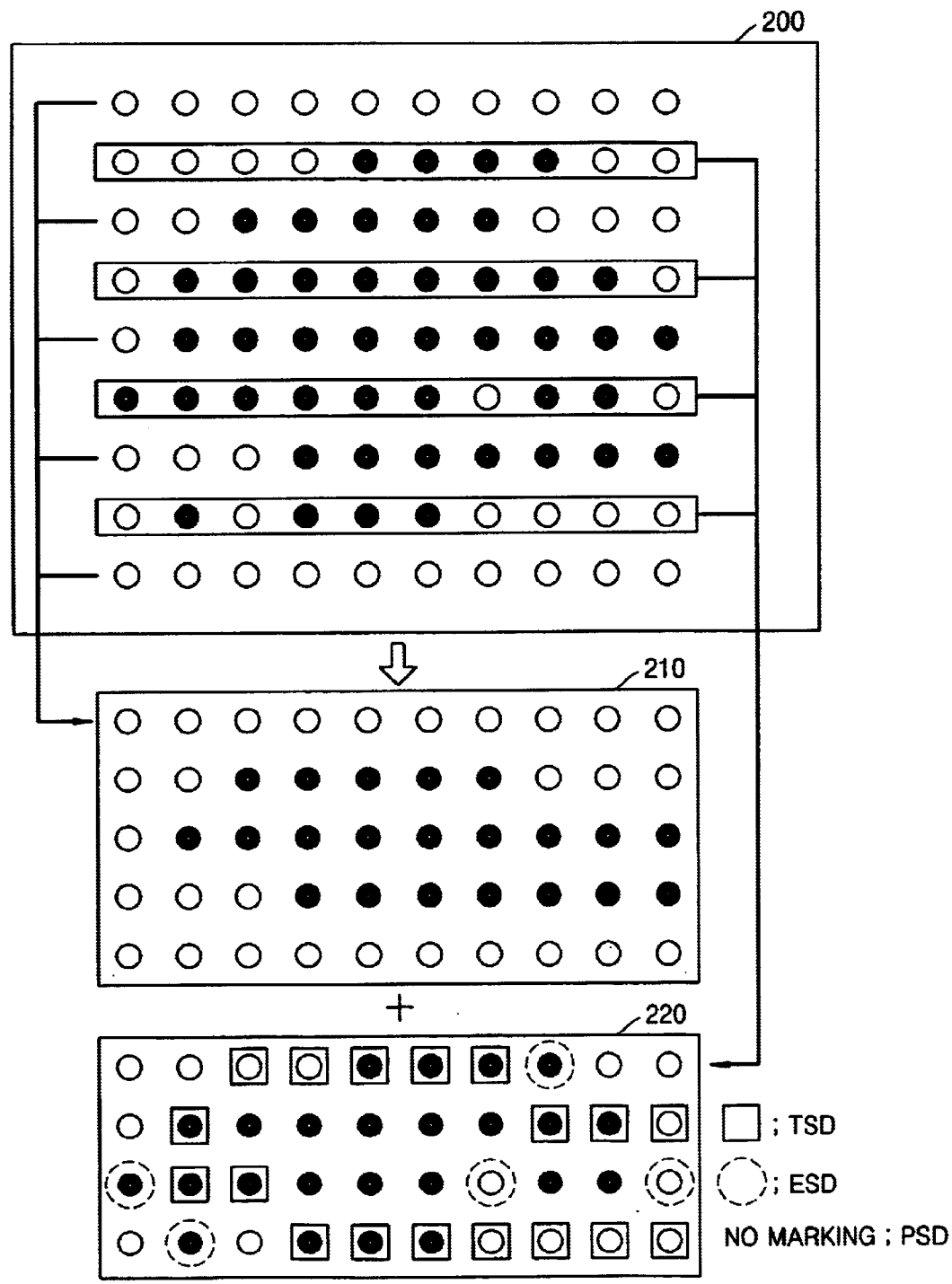
FIG. 2 illustrates a conventional scan interleaving method.

In step (302), the received binary image data is scan-interleaved. In steps (303) and (304), the base image data 210 and the object image data 220 shown in FIG. 2 are obtained.

In step (305), the base image data 210 is encoded.

In step (306), it is determined whether the object image data 202 contains ESD, and encoding is performed differently depending on the result.

In the absence of ESD, an XOR operation is performed on pixel data of the base image data 210 which correspond to pixel data of the object image data 220. Only if the result is "1", the pixel data corresponding to the object image data 220 are encoded, in step (307).

That is, in the absence of ESD, only TSD is encoded.

In presence of ESD, all the pixel data of the object image data 220 is encoded, in step (308).

In steps (307) and (308), a specific method for encoding each object pixel to be encoded is expressed as if($C_{xy}==0$)

Entropy encoding using $P\{0|(C_{xy})\}$ else if $C_{xy}==1$

Entropy encoding using $P\{1|F(C_{xy})\}$ ... (1)

$F(C_{xy})=[C_1, C_2, C_3, \ldots, C_n]$ ... (2)

Here, $C_{xy}$ is a pixel which is located at [x, y], $F(C_{xy})$ denotes the context of $C_{xy}$ and $P\{0|F(C_{xy})\}$ and $P\{1|F(C_{xy})\}$ are the conditional probability density functions.

Figure 4:
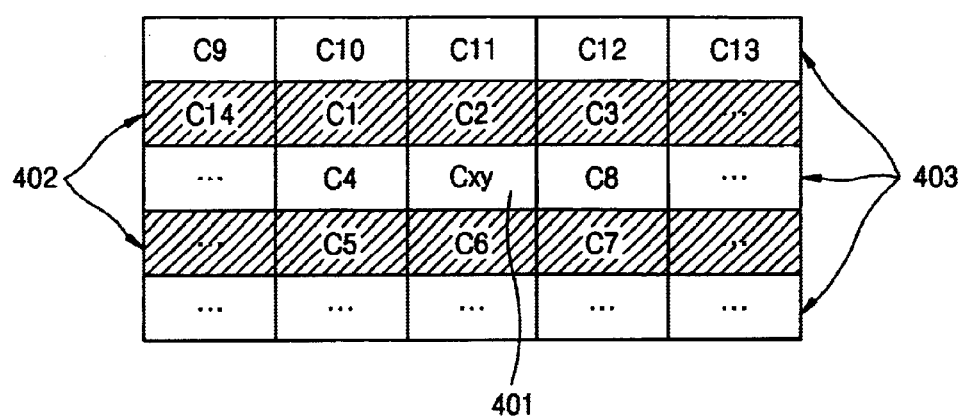
FIG. 4 describes the neighboring pixels for obtaining the context value of current pixel.

FIG. 4 illustrates a relationship between an object pixel to be encoded and pixels adjacent thereto. In FIG. 4, $C_{xy}$ (401) represents a current object pixel to be encoded, and $C_1$–$C_{14}$ represent adjacent pixels. Reference numeral 402 denotes pixels of the base image data 210 and reference numeral 403 denotes pixels of the object image data 220.

In Equation (1), $P\{0|F(C_{xy})\}$ and $P\{1|F(C_{xy})\}$ are conditional probability values, when a current pixel to be encoded is "0" and "1", respectively.

Here, probability data may be made in advance or renewed during encoding.

The embodiment of the scan interleaving method according to the present invention will now be described referring to FIG. 5. A scanning direction using scan interleaving can be set to horizontal-vertical or vertical-horizontal. Here, horizontal-vertical scanning is general raster scanning, whereas vertical-horizontal scanning changes the scanning order of the horizontal-vertical scanning.

Changing the scanning direction gives rise to changes in encoding efficiency. In the embodiment of FIG. 5, the number of bits generated according to each scanning direction is compared, and encoding is performed in the scanning direction in which the least number of bits are generated, thus increasing the encoding efficiency.

Figure 5:
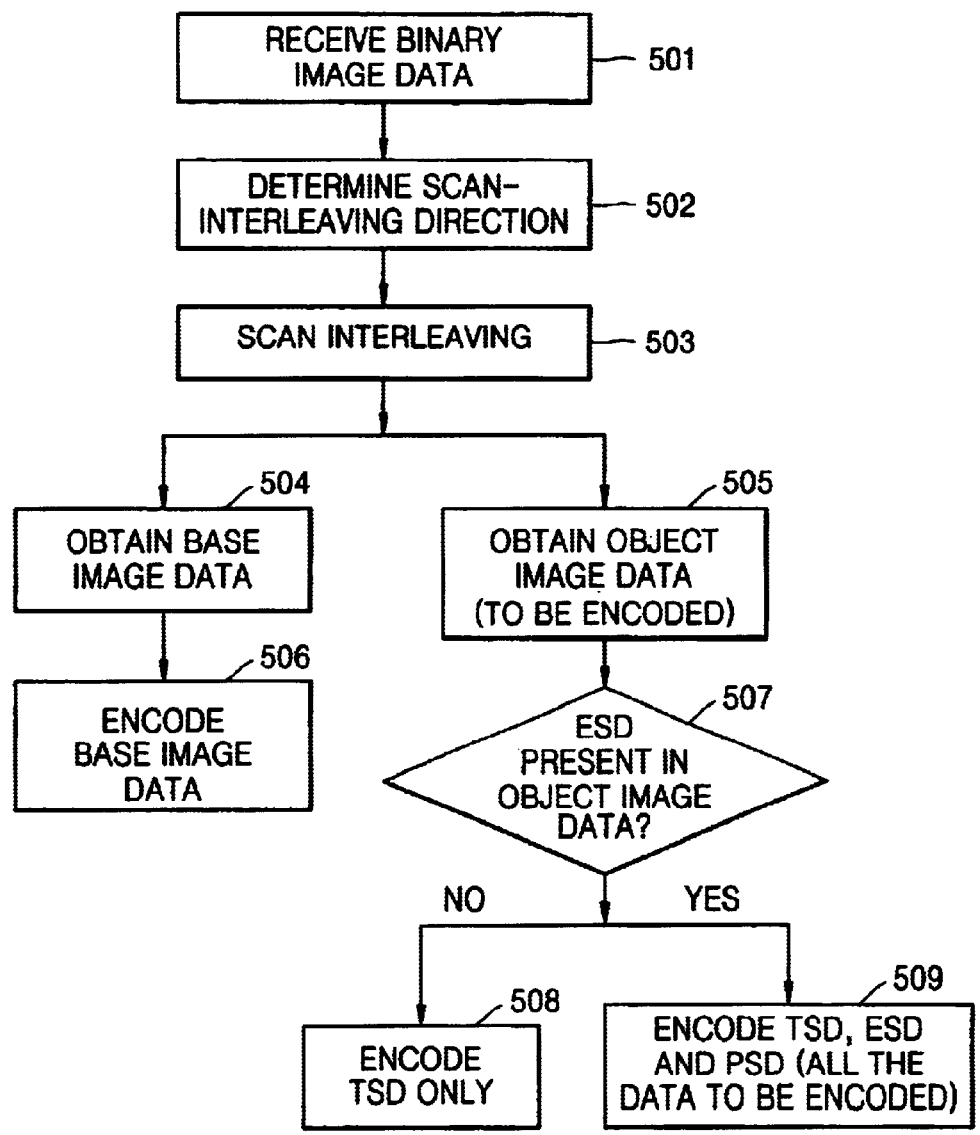
FIG. 5 is a flowchart of a scan interleaving method according to another embodiment of the present invention.

The method shown in FIG. 5 includes the steps of: (501) receiving binary image data; (502) determining a scan-interleaving direction for the received binary image data; (503) scan-interleaving in the determined direction; (504) obtaining base image data from the scan-interleaved result; (505) obtaining object image data from the scan-interleaved result; (506) encoding the base image data obtained in step (504); (507) determining whether the object image data obtained in step (505) contains ESD; (508) encoding TSD only when there is no ESD; and (509) encoding all the data of the object image data (TSD, ESD and PSD) when ESD is present.

Figure 6:
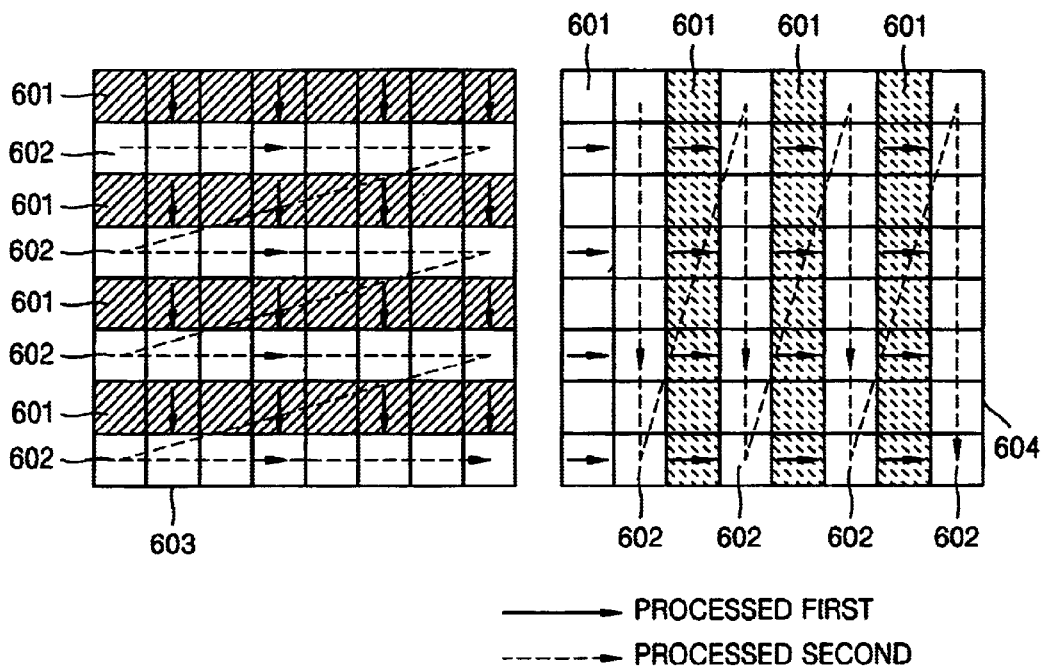
FIG. 6 is referred to when describing a scan interleaving direction determining method in step 502 shown in FIG. 5.

In step (501), binary image data is received. The received binary image data is scan-interleaved in a horizontal-vertical or vertical-horizontal scanning direction as shown in FIG. 6. In FIG. 6, reference numeral 603 denotes an image according to horizontal-vertical scanning, and reference numeral 604 denotes an image according to vertical-horizontal scanning. In both cases, reference numeral 601 denotes the base image data in the second procedure and reference numeral 602 denotes the object image data in the second procedure.

The number of bits is calculated from the encoded results for the respective cases, and a suitable scanning direction is selected as follows, in step (502).

if (the number of bits using vertical-horizontal encoding≦the number of bits using horizontal-vertical encoding)

vertical-horizontal scan interleaving else, horizontal-vertical scan interleaving ... (3)

The encoding method is described in FIG. 3.

In a method which includes expression (3), the scanning direction in which the sum of the scan-interleaved data is the smallest is determined as the scan interleaving direction.

The number of encoded bits=the number of bits of encoded base image data+the number of bits of encoded object image data.

if the number of bits using vertical-horizontal encoding≦the number of bits using horizontal-vertical encoding vertical-horizontal scan interleaving else, horizontal-vertical scan interleaving ... (4)

In a method which includes expression (4), the scan interleaving direction is determined as the scanning direction in which the sum of the scan-interleaved base image data and object image data is the smallest.

In step (503), scan interleaving is performed in the determined scan interleaving direction. In steps (504) and (505), the base image data 210 and the object image data 220 shown in FIG. 2 are obtained.

In step (506), the base image data 210 is encoded.

In step (507), it is determined whether ESD is present in the object image data 202, and encoding is performed differently depending on the result.

In the absence of ESD, an XOR operation is performed on pixel data of the base image data 210 corresponding to the respective pixel data of the object image data 220. In step (508), the pixel data corresponding to the object image data 220 are only encoded if the result of the respective XOR operation is "1".

In the presence of ESD, all the pixel data of the object image data 220 is encoded, in step (509), without performing the XOR operation.

In the encoding method shown in FIGS. 2 through 6, binary shape data is encoded by referring to the subordinate information of a current layer. In order to perform more effective encoding, the shape data of both the preceding and succeeding frames of the current layer can be used.

According to the present invention, the binary shape data is encoded as follows.

(1) A base layer is retrieved from the current binary shape data.

(2) The base layer is encoded by an arbitrary encoding method.

(3) An enhancement layer having the current binary shape data is encoded by referring to the base layer or a preceding frame.

In such a manner, spatially scalable bitstreams are formed.

The base layer is obtained by performing down-sampling for SI method on the current shape data.

The enhancement layer is encoded in units of blocks and each block is encoded by referring to the base layer and the preceding frame. In order to encode blocks, four block coding modes, that is, an intra_not_coded mode, an intra_coded mode, an inter_not_coded mode and an inter_coded mode, are set. During encoding, additional block data (pixel data within a block), which corresponds to a block coding mode and the determined block coding mode, is encoded.

Here, the intra_not_coded mode is performed by referring to the base layer, without encoding block pixel data. The intra_coded mode is performed by referring to the base layer, with the block pixel data being coded. The inter_not_coded mode is performed by referring to the preceding frame, without block pixel data being coded. The inter_coded mode is performed by referring to the preceding frame, with block pixel data being coded.

The hierarchical binary shape coding method can be extended to multiple layers. In other words, it is determined whether additional spatial layers are necessary or not. If additional layers are necessary, down-sampled shape data is fed to a circulation cycle to obtain the subordinate base layer again, thereby realizing hierarchical shape encoding of an arbitrary number of layers.

Figure 7:
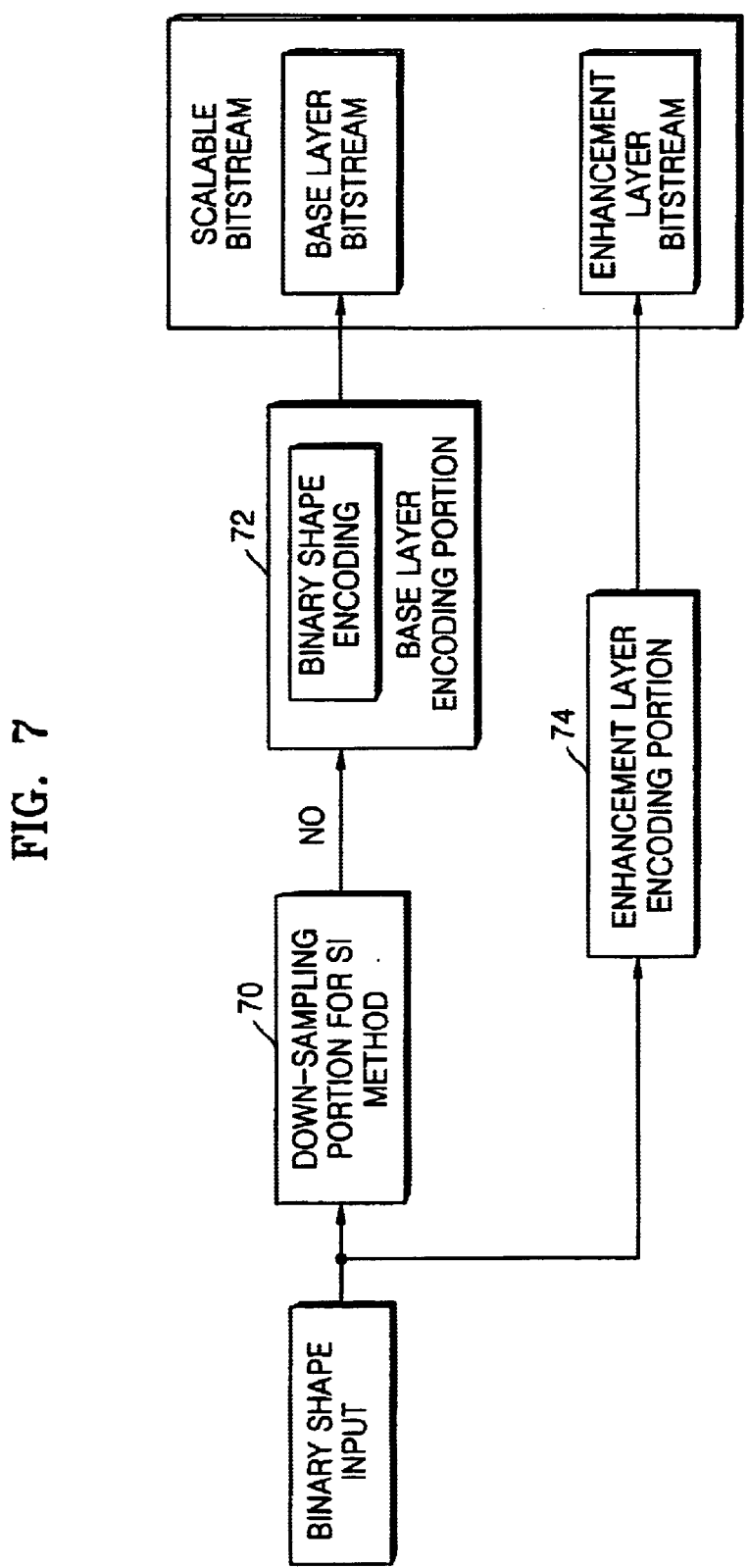
FIG. 7 is a block diagram of an encoder according to the present invention.

FIG. 7 is a block diagram of an encoding apparatus according to the present invention. The apparatus shown in FIG. 7 is a two-layer spatial resolution assisting binary shape encoding apparatus. The encoding apparatus encodes the base layer (the lower-level layer) obtained by performing down-sampling for SI method on original binary shape data and the enhancement layer (the upper layer) having the original binary shape data. Here, the base layer is encoded by an arbitrary encoding method and the enhancement layer is encoded by referring to the base layer or the preceding frame.

The apparatus shown in FIG. 7 includes a down-sampling portion 70 for performing down-sampling for SI method on the current shape data to obtain a base layer, a base layer encoding portion 72 for encoding the obtained base layer using an arbitrary shape encoder, and an enhancement layer encoding portion 74 for encoding an enhancement layer. Spatially scalable bitstreams are produced using these portions.

Figure 8:
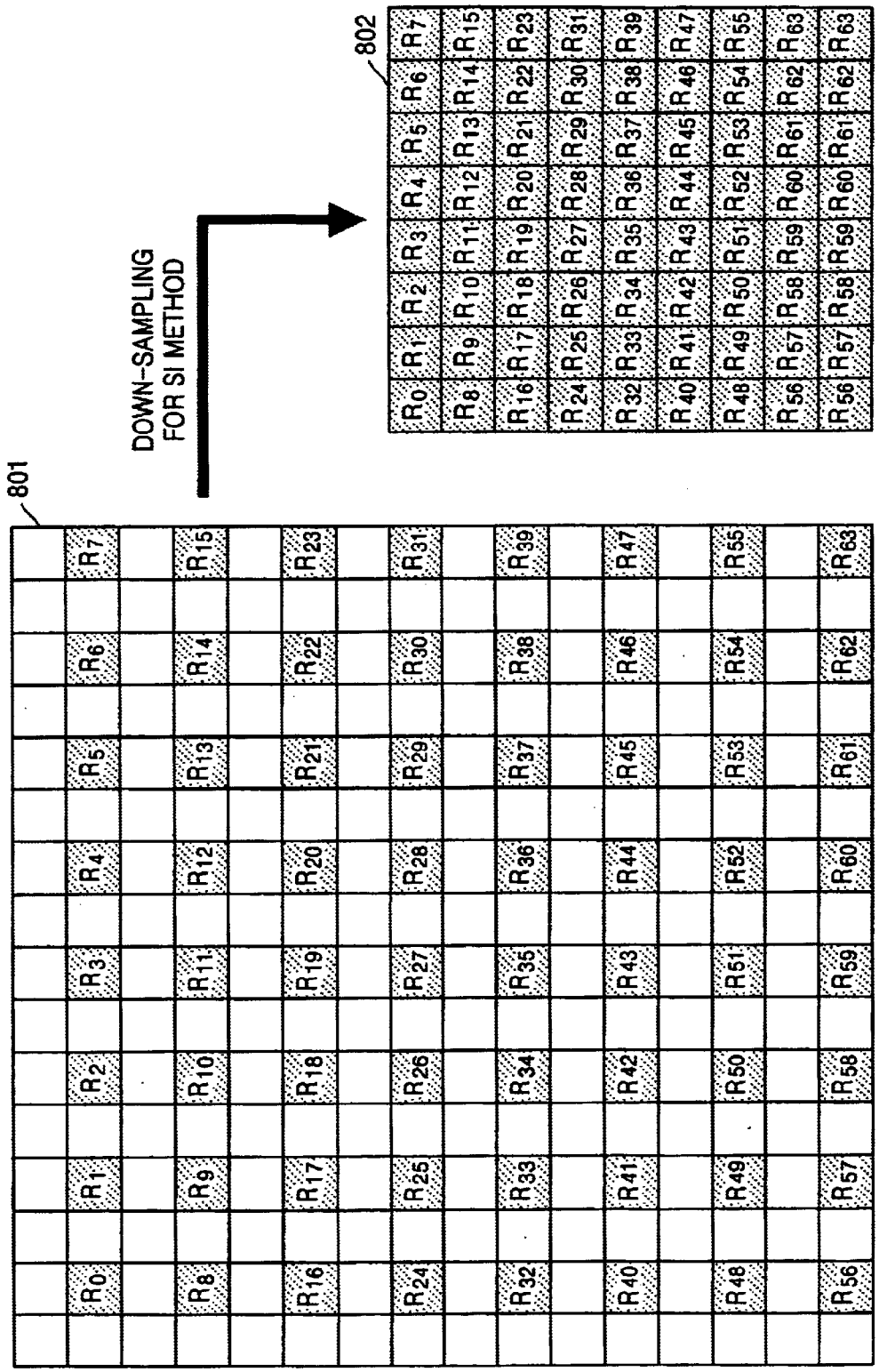
FIG. 8 schematically shows the operation of a down-sampling portion shown in FIG. 7.

In order to construct the base layer, down-sampling for SI method is employed, as shown in FIG. 8.

Here, assuming that the horizontal coordinate of an original binary shape 801 is i which is an integer selected from the group consisting of 0, 1, . . . and 2n, and the vertical coordinate thereof is j which is an integer selected from the group consisting of 0, 1, . . . and 2m, according to the down sampling method for SI method, pixels in which i and j are both odd numbers are sampled to obtain a base layer 802.

Alternatively, a down sampling method having an arbitrary ratio may be employed. For example, in the case where down sampling is done in the ratio of M/N vertically and in the ratio of m/n horizontally, the base layer is obtained as follows.

(1) In down sampling in the ratio of M/N vertically, the maximum integer K not exceeding $\log_2(N/M)$ is obtained.

(2) Every $2^K$th pixel is sampled in the vertical direction.

(3) Every N pixels are sampled in units of $M2^K$ pixels through predetermined ratio linear sampling, with respect to the sampling result in expression (2).

(4) In down sampling in the ratio of m/n horizontally, the maximum integer K not exceeding $\log_2(n/m)$ is obtained, with respect to the sampling result in expression (3).

(5) Every $2^K$th pixels are sampled in the horizontal direction.

(6) Every n pixels are sampled in units of $m2^k$ pixels through predetermined ratio linear sampling, with respect to the sampling result in expression (5), to then be used as the base layer.

Figure 9:
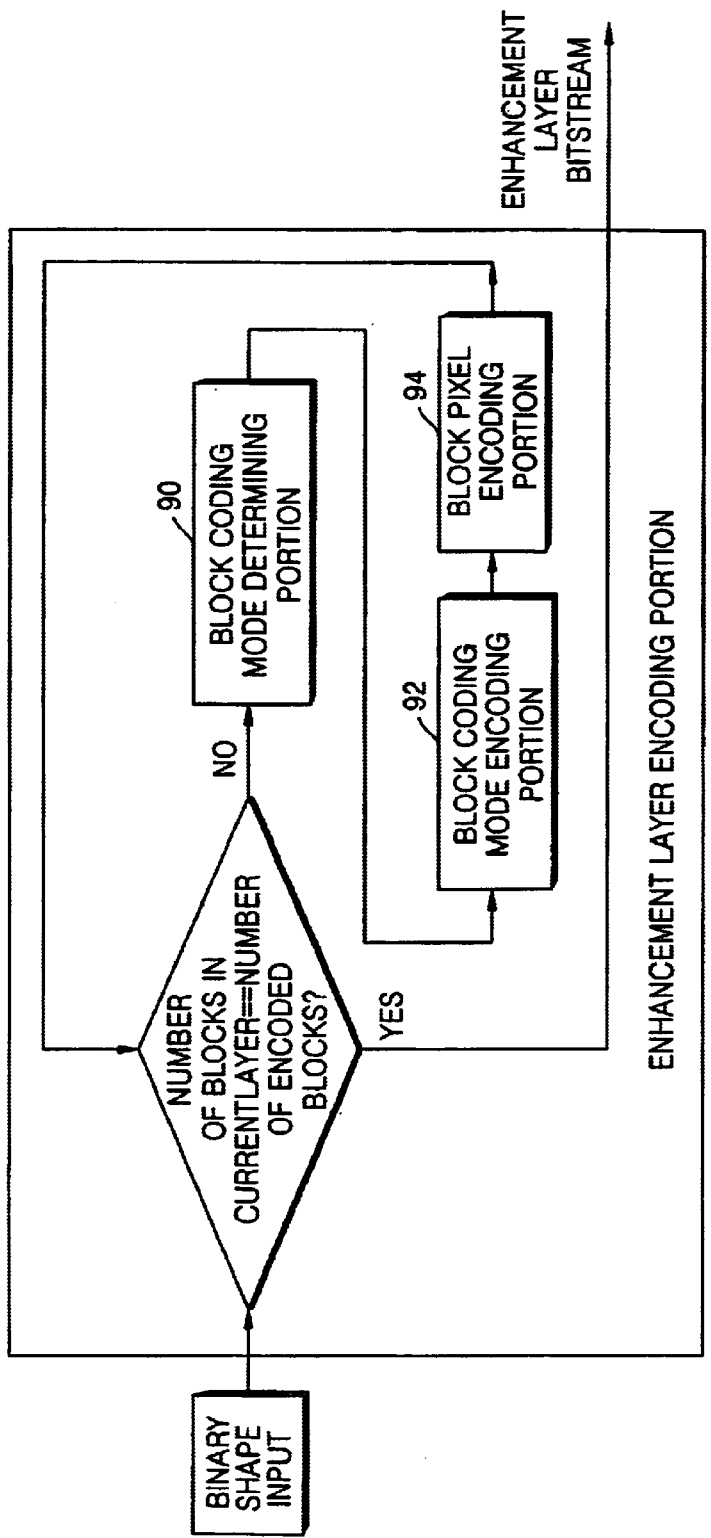
FIG. 9 is a block diagram of an enhancement layer encoder shown in FIG. 7.

FIG. 9 is a detailed block diagram of the enhancement layer encoding portion 74 shown in FIG. 7, which includes a block coding mode determining portion 90, a block coding mode encoding portion 92 and a block pixel encoding portion 94.

The enhancement layer encoding portion 74 divides input shape data into units of blocks having an arbitrary size and encodes the same. Here, the size of a block is generally a 16×16 pixel block. Each block is coded according to an appropriate encoding mode.

The block coding mode determining portion 90 determines the coding mode of a block being currently encoded. Four encoding modes, that is, an intra_not_coded mode, an intra_coded mode, an inter_not_coded mode and an inter_coded mode, can be defined for effectively encoding an enhancement layer in the enhancement layer encoding portion 94 shown in FIG. 9. A block coding mode is determined for each block. The block coding mode indicates the structure of data to be decoded during a decoding operation for restoring the pertinent block. Therefore, during an encoding operation, the determined block coding mode and additional block data (pixel data within a block) is encoded with respect to the block coding mode.

Figure 10:
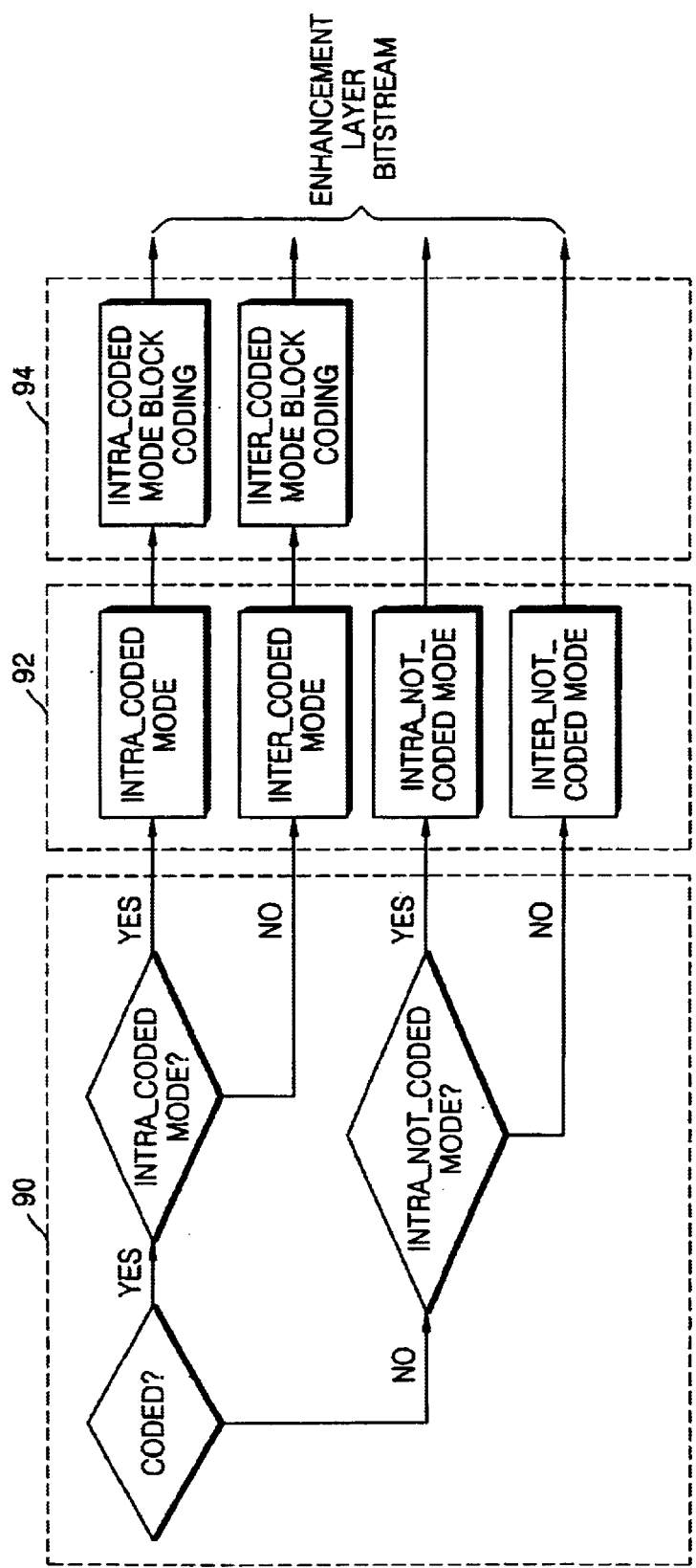
FIG. 10 is a detailed diagram of the enhancement layer encoder shown in FIG. 9.

FIG. 10 shows the four defined block coding modes, that is, intra_not_coded mode, intra_coded mode, inter_not_coded mode and inter_coded mode. The block coding mode for a block being currently encoded is determined by the block coding mode determining portion 90.

The block coding mode determining portion 90 determines whether the current block is a not_coded mode block which can be restored by referring the preceding frame or the base layer or a coded mode block which should be encoded/decoded in units of pixels, determines whether the current block is to be encoded by referring to the base layer or the preceding frame in the coded mode and the not_coded mode, and then selects one of the four block coding modes.

The block coding mode encoding portion 92 generates variable-length codes for the coding mode of the current block by referring to the coding mode of the base layer, as shown in Table 1.

TABLE 1-A

Variable-length code for block coding mode encoding/decoding during P-VOP encoding (in the case of not referring to the base layer)

| Block coding mode (enh_bab_type) | Code |
|---|---|
| 0 (intra_not_coded) | 1 |
| 1 (intra_coded) | 01 |

TABLE 1-B

Variable-length code for block coding mode encoding/decoding
during P-VOP encoding (in the case of referring to the base layer)

| Encoding mode | Enhancement layer (Currently coded/decoded layer) | |
|---|---|---|
| Base layer encoding mode Referred block | 0 (intra_not_coded) | 1 (intra_coded) |
| Base layer 0 | 0 | 01 |
| 1 | 01 | 1 |

TABLE 1-C

Variable-length code for block coding mode encoding/decoding
during B-VOP encoding using the base layer block coding mode

| Encoded/decoded block encoding mode | Enhancement layer (Currently coded/decoded layer) | | | |
|---|---|---|---|---|
| Base layer encoding mode Referred block | 0 (intra_not_coded) | 1 (intra_coded) | 2 (inter_not_coded) | 3 (inter_coded) |
| Base layer 0 | 1 | 01 | 001 | 000 |
| 1 | 110 | 0 | 10 | 111 |
| 2 | 001 | 01 | 1 | 000 |
| 3 | 110 | 0 | 111 | 10 |

TABLE 1-D

Example of matching base layer block coding mode classification
with enhancement layer block coding mode classification in the
case when both classifications are different from each other

| | Neighboring image referring method and block coding mode transformation | |
|---|---|---|
| Shape block encoding mode of base layer | for B-VOP Transformed encoding mode | for P-VOP Transformed encoding mode |
| 0 (MVDs==0 && no_update) | 2 (inter_not_coded) | 1 (intra_coded) |
| 1 (MVDs==0 && no_update) | 2 (inter_not_coded) | 1 (intra_coded) |
| 2 (all_0) | 0 (intra_not_coded) | 0 (intra_not_coded) |
| 3 (all_255) | 0 (intra_not_coded) | 0 (intra_not_coded) |
| 4 (intraCAE5) | 1 (intra_coded) | 1 (intra_coded) |
| 5 (interCAE && MVDs==0) | 3 (inter_coded) | 1 (intra_coded) |
| 6 (interCAE && MVDS!=0) | 3 (inter_coded) | 1 (intra_coded) |

Figure 11A:
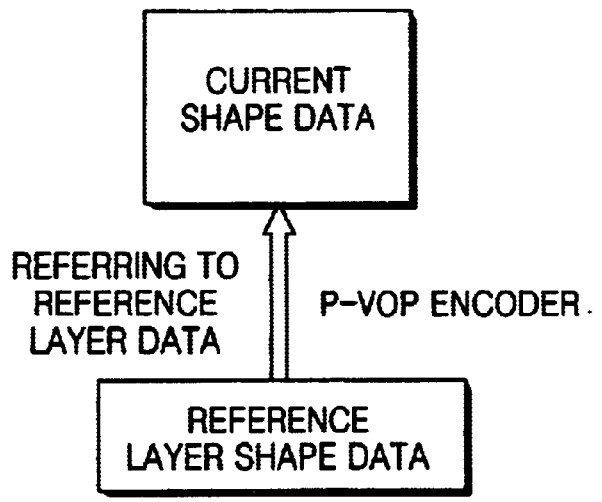
FIGS. 11A and 11B schematically show P-VOP encoding and B-VOP encoding, respectively.
Figure 11B:
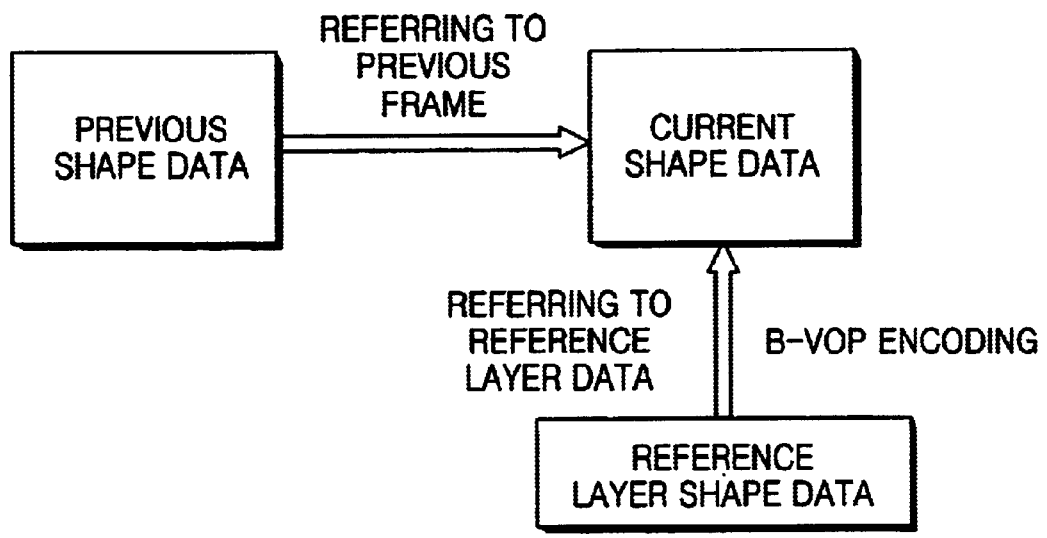

In the case of using P-VOP encoding in which only the base layer is referred to during encoding (FIG. 11A), either Table 1-A or Table 1-B can be used. Table 1-A shows the case of encoding the current block coding mode without referring to the base layer. In order to increase the encoding efficiency, as shown in Table 1-B, the variable-length code (VLC) of the current block coding mode can be determined in accordance with types of block coding modes of the base layer. Also, in the case of referring to the base layer and the preceding frame during encoding (FIG. 11B), VLCs are generated using Table 1-C.

In the case of using B-VOP encoding in which the base layer and the preceding frame are referred to during encoding (FIG. 11B), Table 1-C can be used.

Table 1-C shows the case of determining the VLC of the current block coding mode in accordance with types of block coding modes of the base layer in order to increase the encoding efficiency.

In the case of using the block coding mode of the base layer, since the shape encoding method is different from the enhancement layer encoding method, the types of the block coding modes may differ. In this case, as shown in Table 1-D, the block coding mode is transformed into the same type of the block coding mode of the enhancement layer to be used.

Figure 12A:
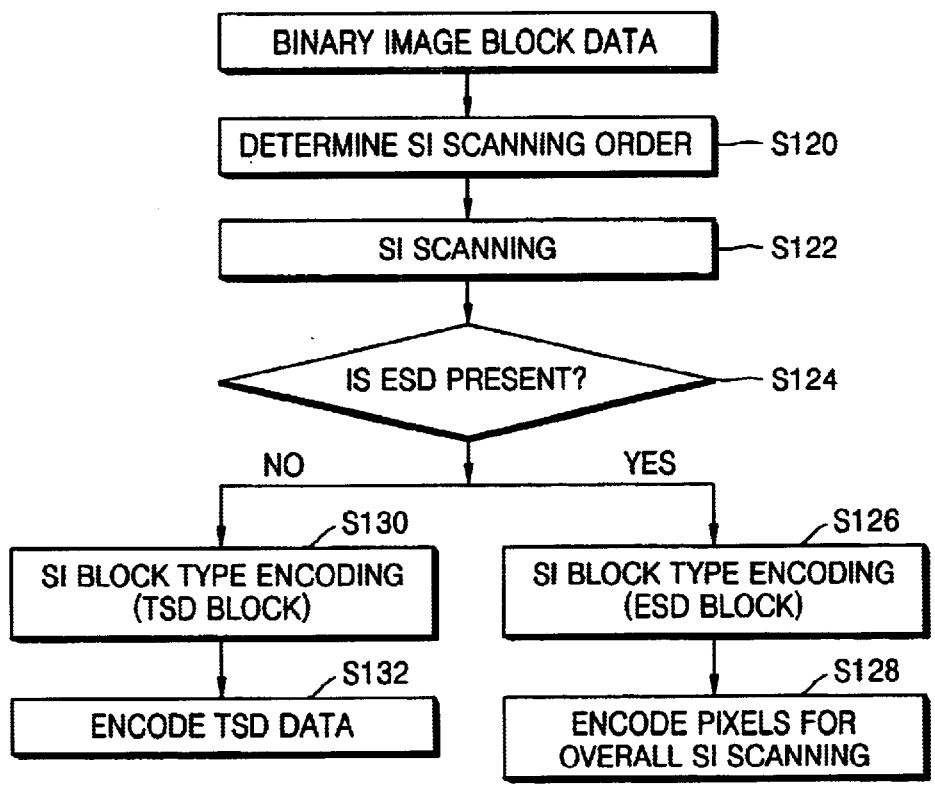
FIGS. 12A and 12B are flowcharts showing the intra_coded mode block encoding and decoding operations, respectively.

If the block coding mode is an intra_coded mode, additional block data (pixel data within a block) must be encoded referring to the base layer by SI encoding using neighboring pixel data, as shown in FIG. 12A.

If the block coding mode is an inter_coded mode, block pixel data is encoded. Shape block pixel data is retrieved from the preceding frame by motion compensation and then arithmetic encoding using context values of neighboring pixels, that is, context based arithmetic encoding (CAE), is performed on all of the block pixels by referring to the shape block pixel data. Here, a motion vector for motion compensation in the preceding frame is not separately encoded, just by using the doubled motion vector of the motion vector used at the block position of the base layer corresponding to that of the current layer.

In more detail, the motion vector used at the block position of the base layer corresponding to that of the current layer is used by multiplying vertical and horizontal components of the motion vector by a vertical to horizontal magnification ratio between layers, that is, enhancement layer/base layer.

Also, for the intra_not_coded mode and the inter_not-coded mode, additional data (block pixel data) is not encoded.

A method for encoding additional data (block pixel data) will now be described in detail. Referring to FIG. 12A, first, the SI scanning order is determined from V-H SI (Vertical-Horizontal Scan Interleaving) and H-V SI (Horizontal-Vertical Scan Interleaving) as shown in FIGS. 13A and 13B, respectively (step S120). SI scanning is performed in the selected scanning order (step S122) and then it is determined whether there is ESD (step S124). If there is ESD in the block that is currently being encoded (see FIG. 2), an ESD block ("1") is encoded in an enh_block_type mode (step S126) and all pixels to be scanned are entropy encoded (step S128). If there is no ESD present in step S124, a TSD block ("0") is encoded in the enh_block_type mode (step S130) and then only pixels corresponding to TSD data among pixels to be scanned are entropy encoded (step S132).

Selection of the SI scanning order in step S120 can be done by the methods which include expressions (3) and (4), and in particular, by referring to the context of the shape data being at a location equivalent to that of the base layer.

Figure 14A:
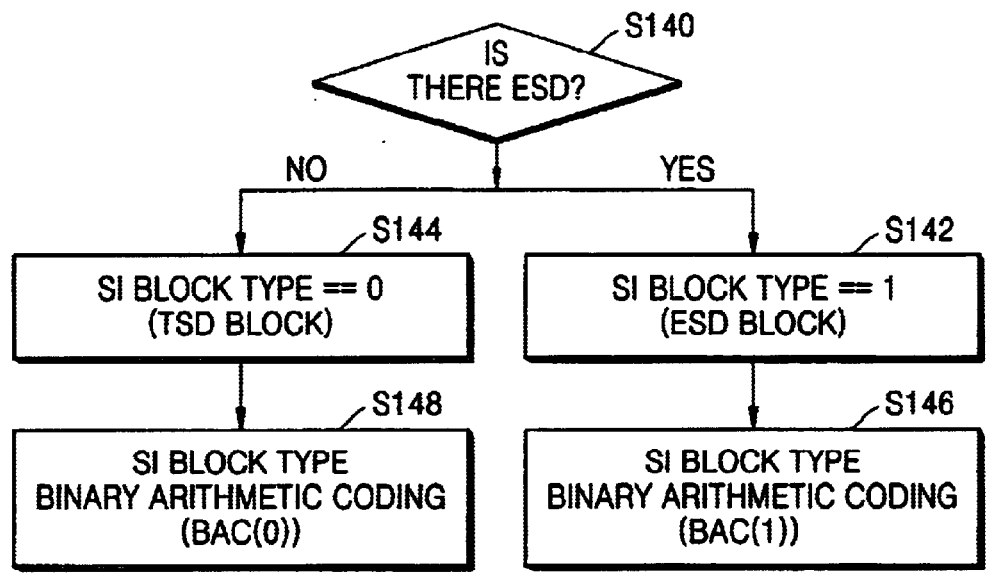
FIGS. 14A and 14B are flowcharts showing SI block type encoding and decoding operations, respectively.

FIG. 14A is a flowchart showing an SI block type encoding operation. Referring to FIG. 14A, the SI block type encoding is performed by determining whether ESD is present and dividing an SI block type into a TSD block and an ESD block (step S140) which are matched to "0" (TSD block) and "1" (ESD block), respectively (steps S142 and S144) and then binary arithmetic encoding is performed thereon (steps S146 and S148). When the binary arithmetic encoding is performed on the SI block type, the probability table expressed in Table 2 can be used.

Table 2 is the probability table for enh_block_type encoding/decoding in an intra_coded mode.

Table 2

SI_bab_type_prob[0]={59808}

Here, SI_bab type_prob[0] is a probability value when the enh_block_type is "0", that is, a TSD block.

Therefore, when the enh_block_type is "1", that is, an ESD block, the probability value SI_bab_type_prob[1] is (65536-59808).

Table 2 is a probability table obtained by converting an arbitrary probability value equal to or greater than 0 and smaller than 1 into 16 bit resolution (an integer equal to or greater than 0 and smaller than 65536). In particular, since Table 2 is for the case when an encoding symbol is "0", in the case when the encoding symbol is "1", entropy encoding can be performed by using a value obtained by subtracting a corresponding probability value from 65536.

Pixel values of the TSD and ESD blocks are entropy-encoded by obtaining context values using Expression (5) by referring to seven neighboring pixel values $C_0$ through $C_6$ disposed in a 'c' shape with respect to the respective scanning directions in the V-H SI scanning direction (FIG. 15A) and H-V SI scanning direction (FIG. 15B). The probability value for the current pixel value to appear in the corresponding context is obtained from the context values using Expression (6).

$$F(C_{xy}) = \sum_{k=0}^{6} 2^k \cdot C_k \quad (5)$$

where $C_k$=0 or 1, that is, a binary pixel value.

if($C_{xy}$=0)

Entropy encoding by P{0|F($C_{xy}$)}(BAC(0))

else f($C_{xy}$==1) . . . (6)

Entropy encoding by P{1|F($C_{xy}$)}(BAC(1))

where P{0|F($C_{xy}$)} is a probability value for the pixel value to be "0" when the context value is F($C_{xy}$), P{1|F($C_{xy}$)} is a probability value for the pixel value to be "1" when the context value is F($C_{xy}$), and F($C_{xy}$) is an integer equal to or greater than 0 and smaller than 128, that is 0≦F($C_{xy}$)<128.

Here, probability values for entropy encoding the current pixel value corresponding to each context value are shown in Table 3, in which enh_intra_v_prob[128] is used for scanned pixels 0 through 63, and enh_intra_h_prob[128] is used for scanned pixels 64 through 191.

Table 3 is also a probability table obtained by converting an arbitrary probability value equal to or greater than 0 and smaller than 1 into 16 bit resolution (an integer equal to or greater than 0 and smaller than 65536). In particular, since Table 3 is for the case when an encoding symbol is "0", in the case when the encoding symbol is "1", entropy encoding can be performed by using a value obtained by subtracting a corresponding probability value from 65536. Also, entropy encoding for pixel values of the TSD and ESD blocks is performed by using binary arithmetic coding.

TABLE 3

(In the case when F($C_{xy}$) = 64~191,
P{0|F($C_{xy}$)} = enh_intra_h_prob[F($C_{xy}$)]
P{1 |F($C_{xy}$)} = 65536 - enh_intra_h_prob[F($C_{xy}$)]
enh_intra_h_prob[128]={
65510, 63321, 63851, 62223, 64959, 62202, 63637, 48019, 57072, 33553,
37041, 9527, 53190, 50479, 54232, 12855, 62779, 63980, 49604, 31847,
57591, 64385, 40657, 8402, 33878, 54743, 17873, 8707, 34470, 54322,
16702, 2192, 58325, 48447, 7345, 31317, 45687, 44236, 16685, 24144,
34327, 18724, 10591, 24965, 9247, 7281, 3144, 5921, 59349, 33539,
11447, 5543, 58082, 48995, 35630, 10653, 7123, 15893, 23830, 800,
3491, 15792, 8930, 905, 65209, 63939; 52634, 62194, 64937, 53948,
60081, 46851, 56157, 50930, 35498, 24655, 56331, 59318, 32209, 6872,
59172, 64273, 46724, 41200, 53619, 59022, 37941, 20529, 55026, 52858,
26402, 45073, 57740, 55485, 20533, 6288, 64286, 55438, 16454, 55656,
61175, 45874, 28536, 53762, 58056, 21895, 5482, 39352, 32635, 21633,
2137, 4061, 58490, 14100, 18724, 10461, 53459, 15490, 57992, 15128,
12034, 4340, 6761, 1859, 5794, 6785, 2412, 35}
(In the case when F($C_{xy}$) = 0~63,
P{0|F($C_{xy}$)} = enh_intra_v_prob[F($C_{xy}$)]
P{1|F($C_{xy}$)} = 65536 - enh_intra_v_prob[F($C_{xy}$)]
enh_intra_v_prob[128]={
67476, 64428, 62211, 63560, 52253, 58271, 38098, 31981, 50087, 41042,
54620, 31532, 8382, 10754, 3844, 6917, 63834, 50444, 50140, 63043,
58093, 45146, 36768, 13351, 17594, 28777, 39830, 38719, 9768, 21447,
12340, 9786, 60461, 41489, 27433, 53893, 47246, 11415, 13754, 24965,
51620, 28011, 11973, 29709, 13878, 22794, 24385, 1558, 57065, 41918,
25259, 55117, 48064, 12960, 19929, 5937, 25730, 22366, 5204, 32865,
3415, 14814, 6634, 1155, 64444, 62907, 56337, 63144, 38112, 56527,
40247, 37088, 60326, 45675, 51248, 14141, 18868, 43723, 14757, 11721,
62436, 50971, 51738, 59767, 49927, 50675, 38182, 24724, 48447, 47316,
56628, 36336, 12264, 25893, 24243, 5358, 58717, 56646, 48302, 60515,
36497, 26959, 43579, 40280, 54092, 20741, 10891, 7504, 8019, 30840,
6772, 4090, 59810, 61410, 53216, 64127, 32344, 12462, 23132, 19270,
32232, 24774, 9615, 17750, 1714, 6539, 3237, 152}

The encoding efficiency of additional block data (block pixel data) for an intra_coded mode can be increased by obtaining shape block pixel data from the preceding frame by motion compensation and including the same in the context values during arithmetic encoding using neighboring pixel data. Here, the doubled motion vector of the motion vector used at the block position of the base layer corresponding to that of the current layer is used as a motion vector.

In more detail, the motion vector used at the block position of the base layer corresponding to that of the current layer is used by multiplying vertical and horizontal components of the motion vector by a vertical to horizontal magnification ratio between layers, that is, enhancement layer/base layer.

Figure 16:
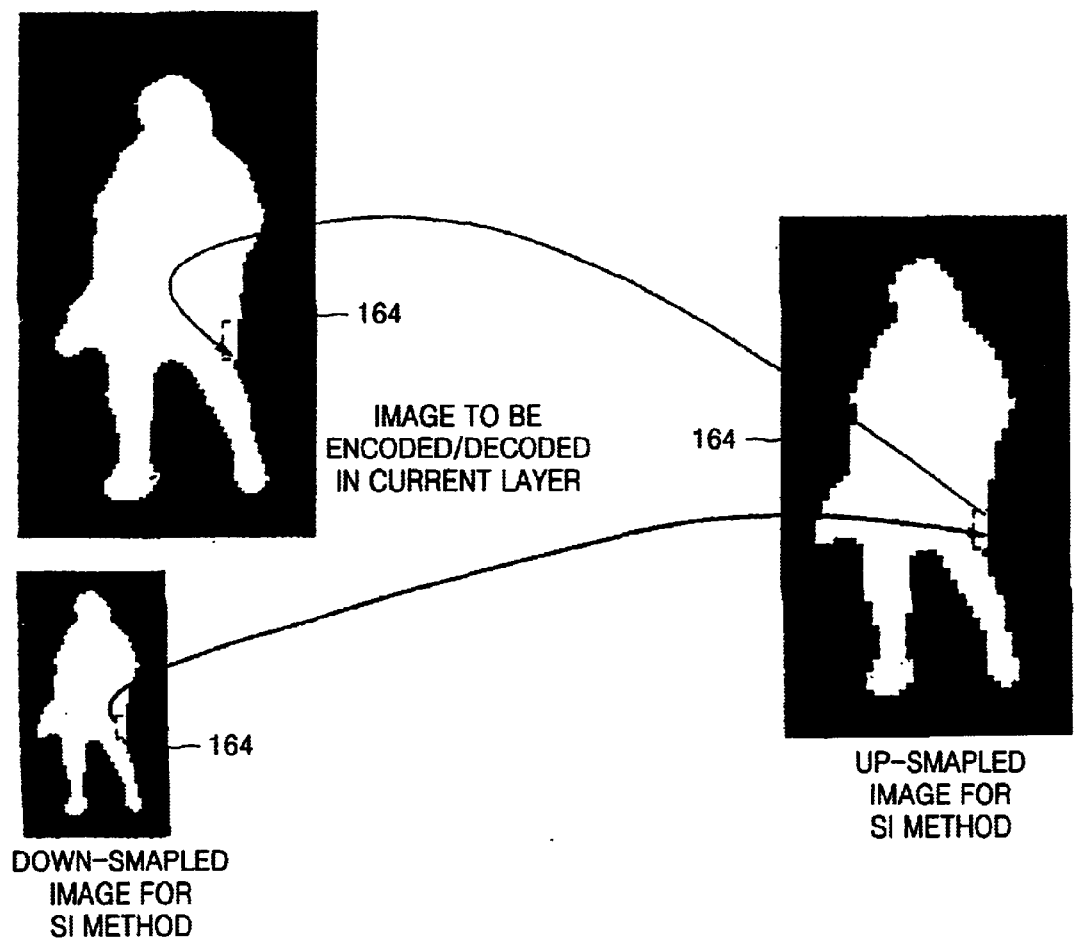
FIG. 16 schematically shows intra_not_coded mode block encoding and decoding.

In an intra_not_coded mode, as shown in FIG. 16, the current block can be restored to over a predetermined level obtained by performing up-sampling for SI method on the base layer 160, by referring to a block which is from the shape data 162 at the corresponding location of an image 164 to be encoded/decoded in the current layer. Additional data other than the block coding mode does not need to be encoded. Here, the predetermined level is an error level between blocks, the error level ranging from zero to an arbitrary level.

In an inter_not_coded mode, shape block pixel data is retrieved from the preceding frame by motion compensation and the current block can be restored to over a predetermined level by referring to the block of the motion-compensated preceding frame. Additional data other than the block coding mode does not need to be encoded. Here, the doubled motion vector of the motion vector used at the block position of the base layer corresponding to that of the current layer is used as a motion vector.

In more detail, the motion vector used at the block position of the base layer corresponding to that of the current layer is used by multiplying vertical and horizontal components of the motion vector by a vertical to horizontal magnification ratio between layers, that is, enhancement layer/base layer. Here, the predetermined level is an error level between blocks, the error level ranging from zero to an arbitrary level.

The decoding process corresponding to the hierarchical binary shape encoding process according to the present invention is performed as follows.

(1) A base layer is decoded from the base layer bitstream.
(2) Up-sampling for SI method is performed on the base layer restored in the base layer decoding step.
(3) An enhancement layer is decoded from the hierarchical shape by referring to the base layer or the preceding frame.
(4) It is determined whether restoration of additional spatial layers is necessary or not, and if necessary, the shape data as restored is applied to step (2) for the purpose of referring to the same in the decoding step of the next enhancement layer.

Figure 17:
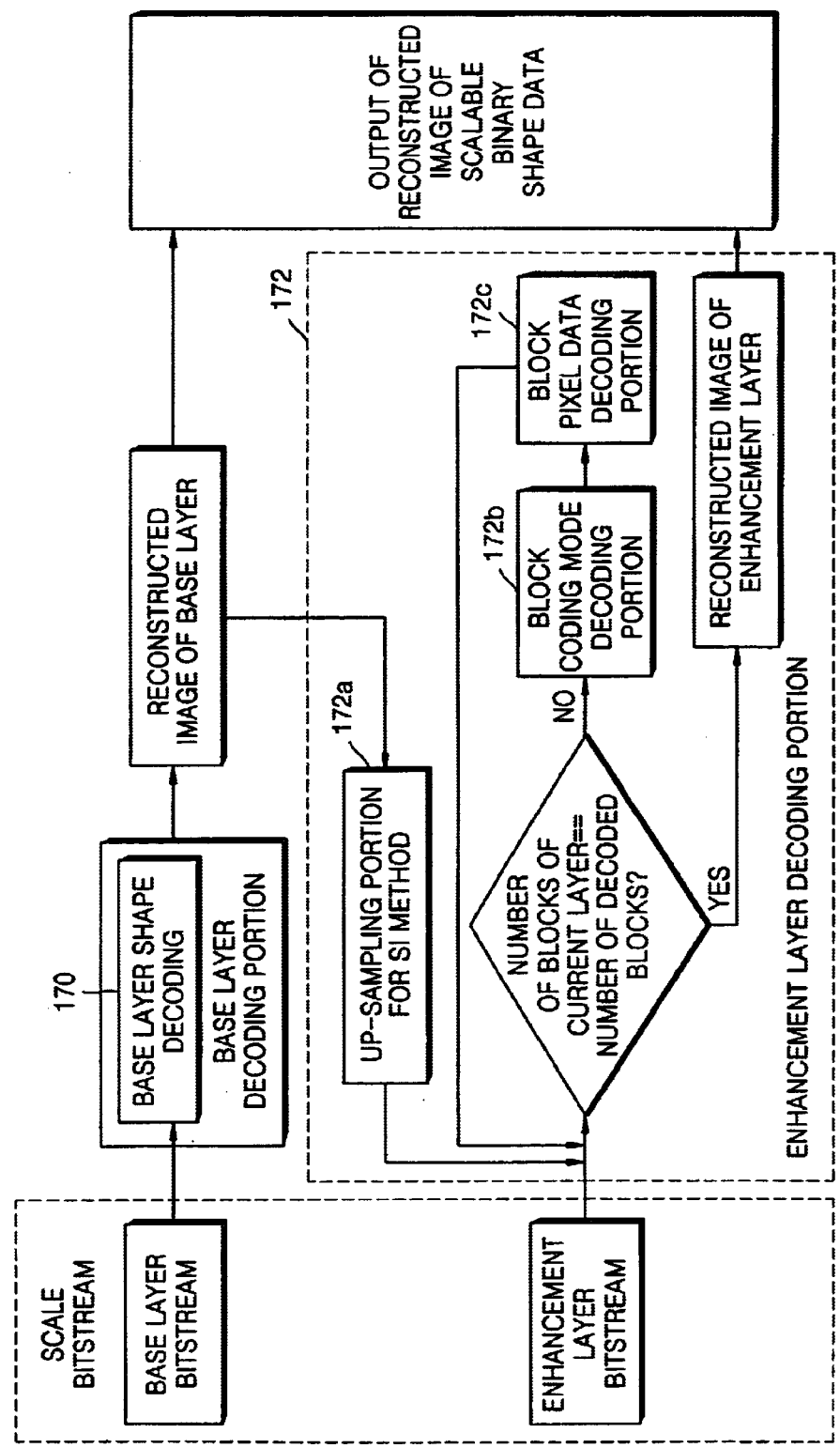
FIG. 17 is a block diagram of a decoder according to the present invention.

FIG. 17 is a block diagram of a decoder corresponding to the encoder shown in FIG. 7.

The decoder shown in FIG. 17 includes a base layer decoding portion 170 for decoding a base layer bitstream from the scalable bitstreams transmitted from the two-layer structured encoder shown in FIG. 7 to thus restore a base layer, and an enhancement layer decoding portion 172 for decoding an enhancement layer bitstream to thus restore an enhancement layer. Hierarchical binary shape data can be obtained using the base layer decoding portion 170 and the enhancement layer decoding portion 172. The enhancement layer is decoded in the unit of blocks by partitioning the same into units of blocks, each block having a predetermined size, based on the binary shape encoding shown in FIG. 7. Here, the block having a predetermined size is generally a 16×16 pixel block.

In the binary shape decoder having a two-layer structure shown in FIG. 17, the base layer is restored using only the base layer bitstream which is a part of scalable bitstreams. The restored base layer has the same resolution as that of the current shape to be reconstructed based on the up-sampling for SI method shown in FIG. 18 and is to be referred to for being used when decoding an enhancement layer.

Figure 18:
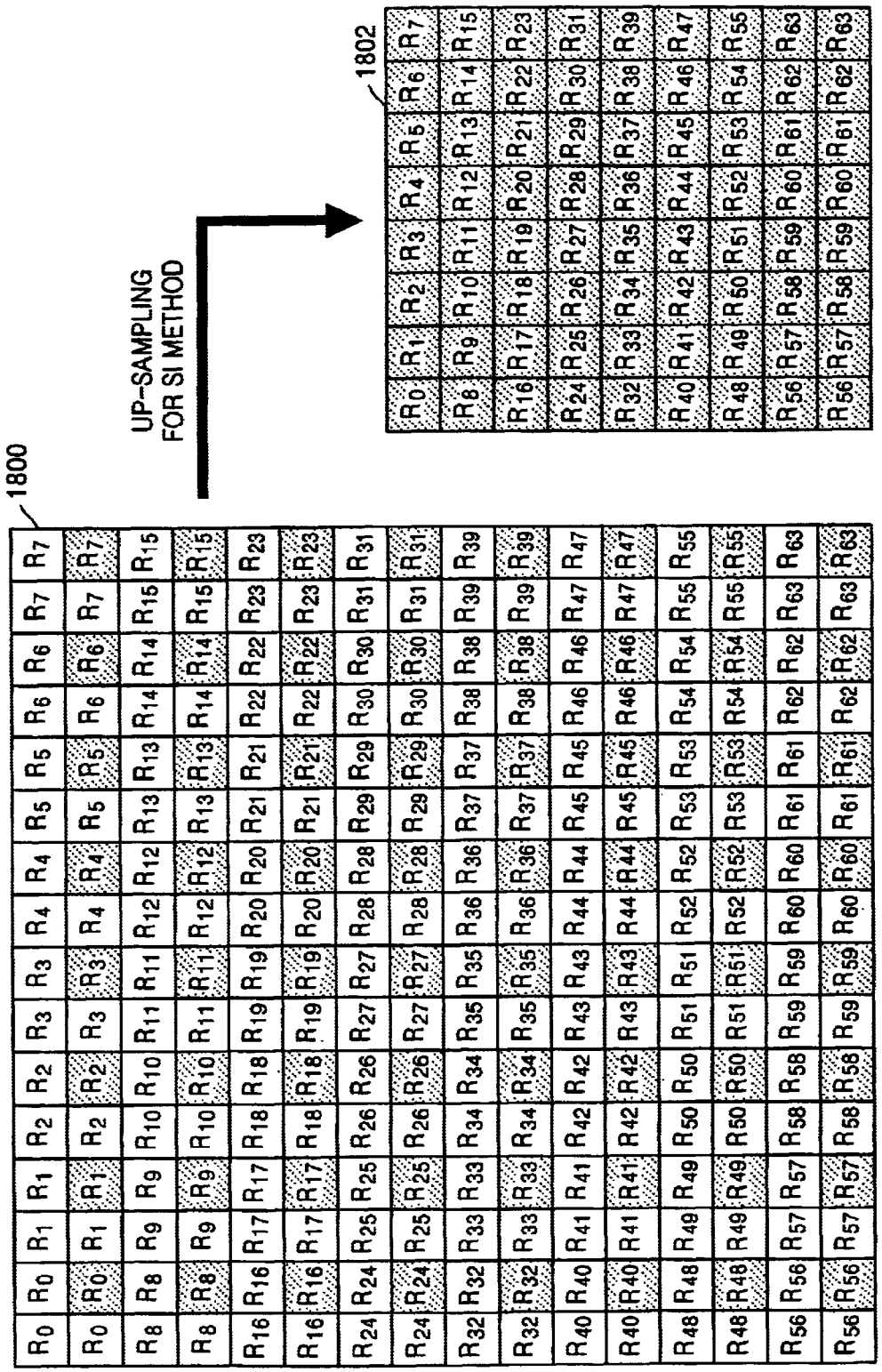
FIG. 18 schematically shows the operation of an up-sampling portion shown in FIG. 17.

Referring to FIG. 18, an up-sampled image 1800 can be obtained by repeatedly replacing pixel values of pixels at locations $(2i, 2j)$, $(2i-1, 2j)$, $(2i, 2j-1)$ and $(2i-1, 2j-1)$ of the up-sampled image 1800 with the pixel values at a location $(I, j)$ of the base layer 1802.

Figure 19:
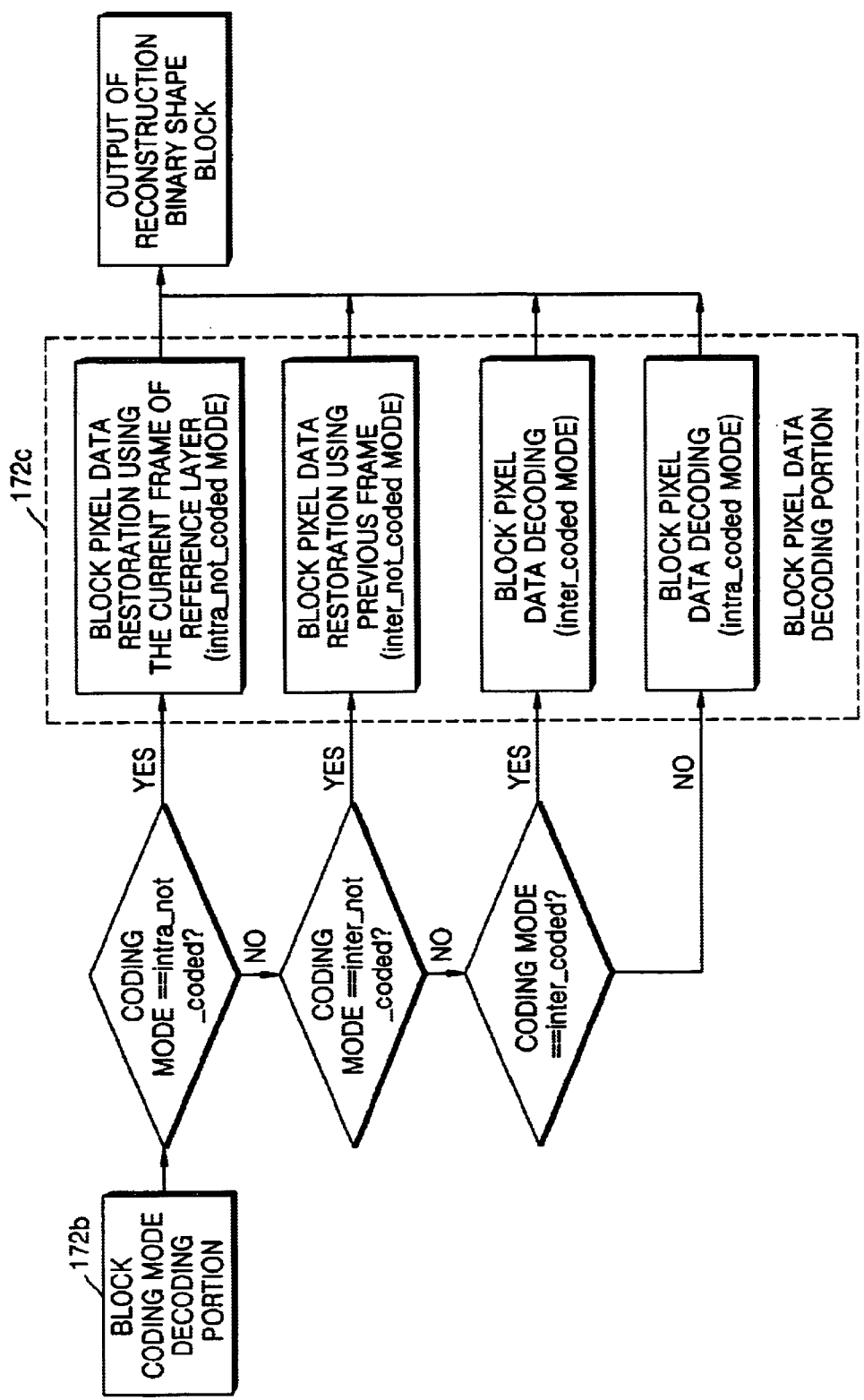
FIG. 19 is a block diagram of an enhancement layer decoder shown in FIG. 17.

FIG. 19 is a detailed block diagram of the block coding mode decoding portion 172b and the block pixel data decoding portion 172c shown in FIG. 17. The block coding mode decoding portion 172b decodes the block coding mode of the corresponding block for the first time. The construction of information to be decoded for restoration of the corresponding block can be known by this mode. The block pixel data decoding portion 172c decodes the block pixel data in accordance with the decoded block coding mode.

In FIG. 19, the process of decoding four block coding modes, that is, an intra_not_coded mode, an intra_coded mode, an inter_not_coded mode, and an inter_coded mode, and the process of decoding additional data, are shown.

First, the block coding mode is decoded using Table 1. In the case of P-VOP encoding/decoding in which only the base layer is referred to (FIG. 11A), the coding mode of the current block is decoded using Table 1-A or 1-B. Table 1-A is for the case of encoding/decoding the coding mode of the current block without referring to the base layer. In order to increase the coding efficiency, the variable length code of the coding mode of the current block is determined in accordance with the type of the coding mode of blocks being at the corresponding location of the base layer, as shown in Table 1-B, which can also be used for decoding.

Also, in the case of referring to the base layer and the preceding frame of the enhancement layer in encoding/decoding (FIG. 11B), the coding mode of the current block for a given VLC mode is decoded using Table 1-C. Table 1-C is also used in encoding in which the VLC code of the coding mode of the current block is determined to be the same as that of blocks at the corresponding location of the base layer.

In the case of referring to the block coding mode of the base layer, since the data encoding method of the base layer is different from that of the enhancement layer, the type of the block coding mode may differ. In this case, the block coding mode of the base layer is converted into the same classification system as that of the block coding mode of the enhancement layer, as shown in Table 1-D.

If the block coding mode is an intra_coded mode, additional block data (block pixel data) must be decoded. The decoding is done by referring to the base layer by a SI decoding method using neighboring pixels.

In the case of an inter_coded mode, the block pixel data is also decoded. Shape block pixel data is obtained from the preceding frame by motion compensation, and referring to the same, arithmetic decoding using context values of neighboring pixels (context based arithmetic decoding) is performed on the overall pixels. Here, a motion vector for motion compensation in the preceding frame is not separately decoded, just by using the doubled motion vector of the motion vector used at the block position of the base layer corresponding to that of the current layer.

In more detail, the motion vector used at the block position of t he base layer corresponding to that of the current layer is used by multiplying vertical and horizontal components of the motion vector by a vertical to horizontal magnification ratio between layers, that is, enhancement layer/base layer.

Also, for the intra_not_coded mode and the inter_not-coded m de, additional data (block pixel data) is not decoded.

Figure 12B:
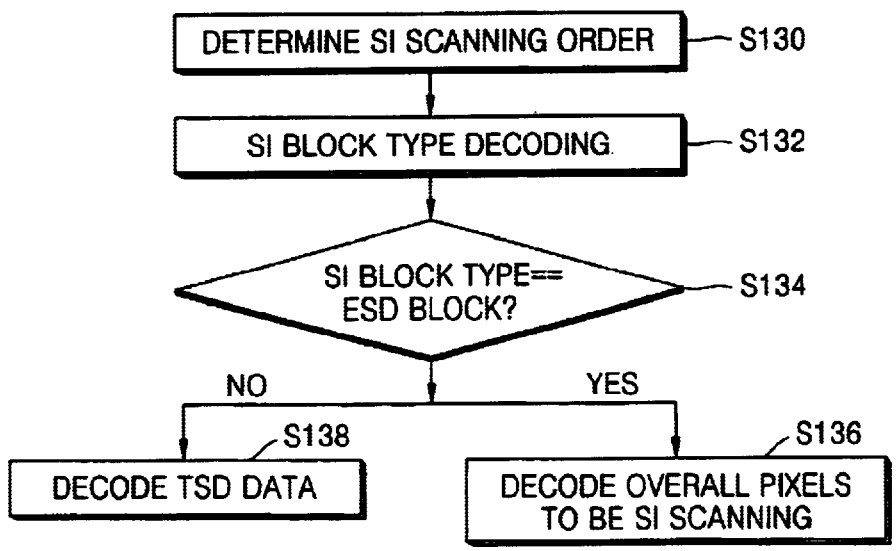

A method for decoding additional data (block pixel data) will now be described in detail. Referring to FIG. 12B, first, the SI scanning order is selected from V-H SI (Vertical-Horizontal Scan Interleaving) and H-V SI (Horizontal-Vertical Scan Interleaving) shown in FIGS. 13A and 13B, respectively (step S130).

Selection of the SI scanning order in step S130 can be done by various appropriate methods, and in particular, by referring to the property of the shape data which is at a corresponding location of the base layer.

Figure 14B:
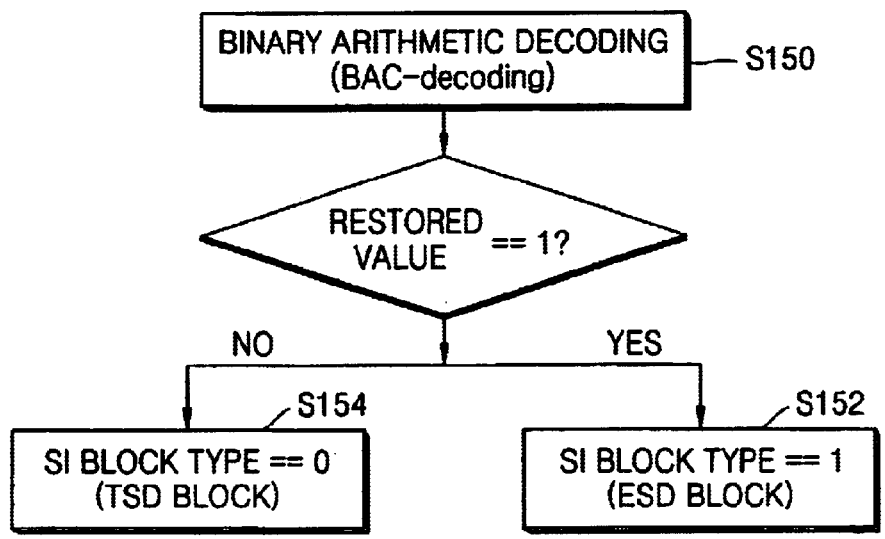

After the SI scanning order is selected, as shown in FIG. 14B, a SI block type is decoded (step S132). If the decoded value is "0", the SI block type is decoded into a TSD block (see FIG. 2). If the decoded value is "1", the SI block type is decoded into an ESD block. Then, the binary value is decoded using a binary arithmetic decoder.

It is determined whether the SI block is an ESD block or not (step S134). If yes, all pixels to be SI-scanned are decoded (step S136). If not, only TSD data is decoded (step S138).

Here, when the binary arithmetic decoding is performed on the SI block type, the probability table expressed in Table 2 can be used.

FIG. 14B is a flow diagram showing the process of decoding a SI block type. In order to decode a block pixel, the SI block type of a current block t be decoded is checked while performed SI scanning in the selected scanning order (step S150). If the SI block is an ESD block ("1"), all pixels to be scanned are entropy decoded (step S152). If the SI block is a TSD block ("0"), only the pixels corresponding to TSD data among the pixels to be scanned are entropy decoded (step S154).

As shown in FIGS. 15A and 15B, entropy decoding for pixel values of the TSD and ESD blocks is performed by obtaining context values using expression (5) by referring to seven neighboring pixel values $C_0$ through $C_6$ disposed in a 'c' shape with respect to the respective scanning directions in the V-H SI scanning direction and H-V SI scanning direction. The probability value for the current pixel value to appear in the corresponding context is obtained from the context values using expression (6).

Here, probability values for entropy decoding the current pixel value corresponding to each context value are shown in Table 3, in which enh_intra_v_prob[128] is used for scanned pixels 0 through 63, and enh_intra_h_prob[128] is used for scanned pixels 64 through 191.

As described above, Table 3 is a probability table obtained by converting an arbitrary probability value equal to or greater than 0 and smaller than 1 into 16 bit resolution (an integer equal to or greater than 0 and smaller than 65536). In particular, since Table 3 is for the case when an encoding symbol is "0", if the decoding symbol is "1", entropy decoding can be performed by using a value obtained by subtracting a corresponding probability value from 65536. Also, pixel values can be entropy decoded by using binary arithmetic decoding.

In the case of an inter_coded mode, additional data (block pixel data) is decoded such that shape block pixel data is obtained from the preceding frame by motion compensation, and referring to the same, arithmetic decoding using context values of neighboring pixels is performed on the all pixels. Here, the doubled motion vector of the motion vector used at the block position of the base layer corresponding to that of the current layer is used as a motion vector.

In more detail, the motion vector used at the block position of the base layer corresponding to that of the current layer is used by multiplying vertical and horizontal components of the motion vector by a vertical to horizontal magnification ratio between layers, that is, enhancement layer/base layer.

In the case of the intra_not_coded mode, as shown in FIG. 16, the block being at the corresponding location of the current block is obtained from the up-sampled image 162 of the base layer 160 and is used as the restoration result of the current block.

In the case of the inter_not_coded mode, shape block pixel data is obtained from the preceding frame by motion compensation (Here, the doubled motion vector of the motion vector used at the block position of the base layer corresponding to that of the current layer is used as a motion vector.) and the motion-compensated block of the preceding frame is used as the restoration result of the current block.

In more detail, the motion vector used at the block position of the base layer corresponding to that of the current layer is used by multiplying vertical and horizontal components of the motion vector by a vertical to horizontal magnification ratio between layers, that is, enhancement layer/base layer.

Figure 20:
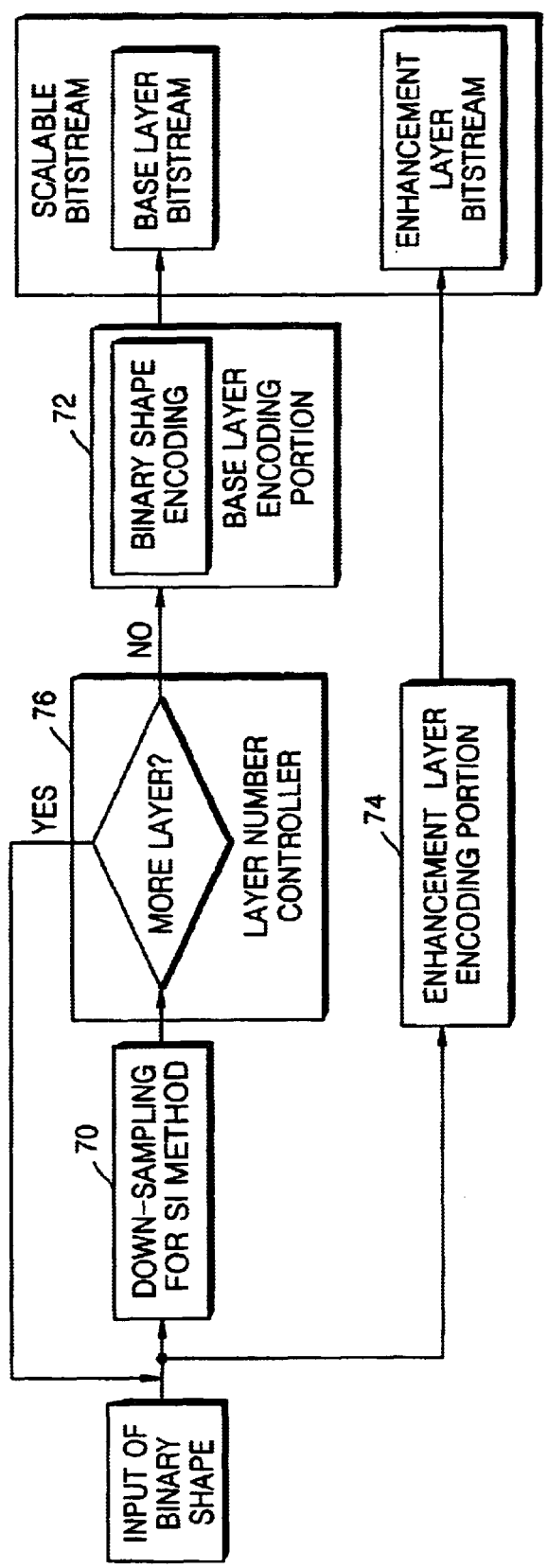
FIG. 20 is a block diagram of an alternative encoder according to the present invention.

FIG. 20 is a block diagram of an alternative encoder according to the present invention, that is, the encoder shown in FIG. 7 is modified to be suitable for multiple layers. A layer number controller 76 is arranged next to a down-sampling portion 70 for SI method, to determine whether supplementary spatial layers are needed or not. If needed, down-sampled shape data is fed back to a down-sampling portion 70 for SI method, thereby realizing scalable shape data encoding, the shape data having an arbitrary number of layers. The encoder has the same configuration as that shown in FIG. 7, except the layer number controller 76.

Figure 21:
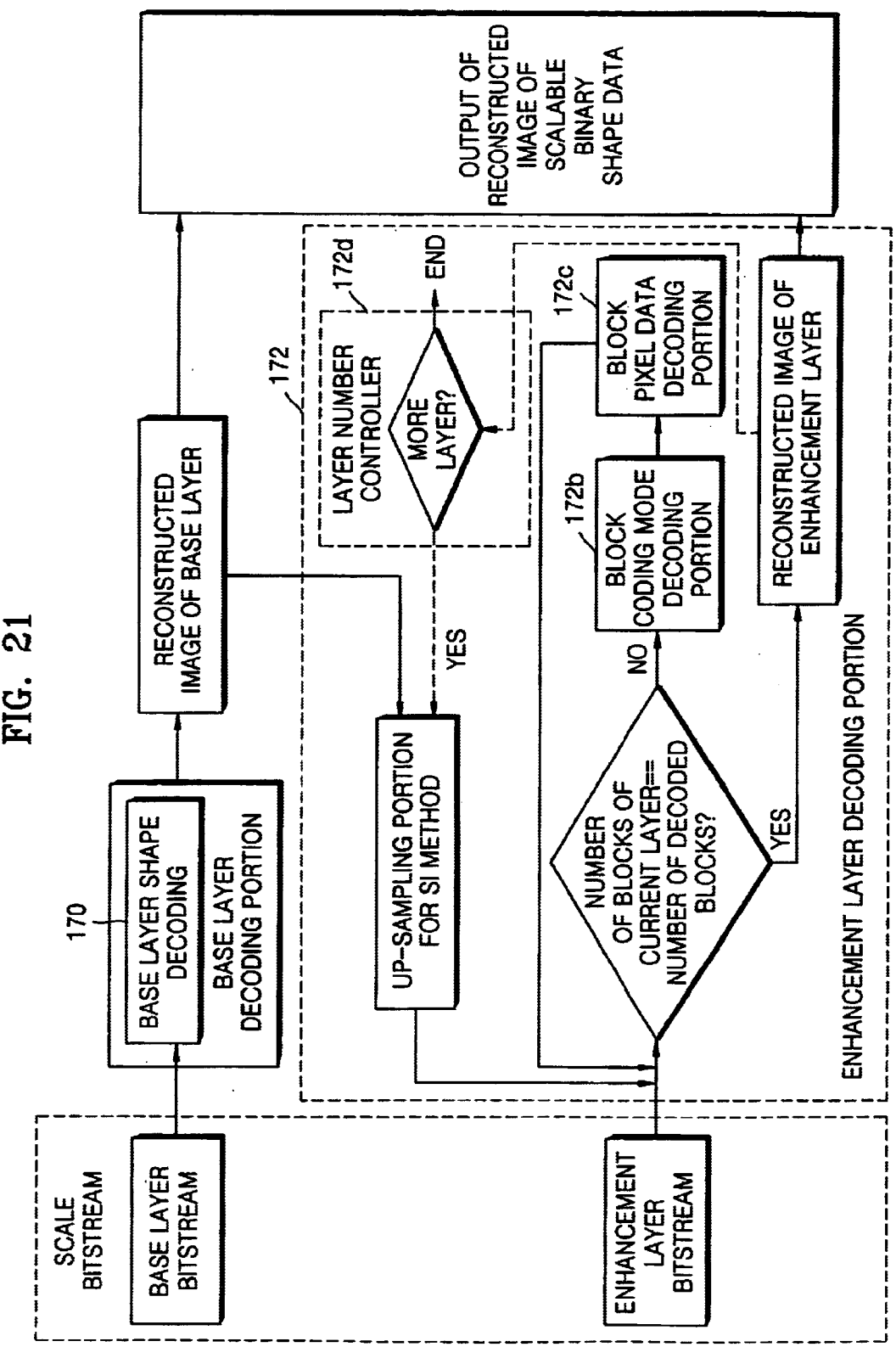
FIG. 21 is a block diagram of an alternative decoder according to the present invention.

FIG. 21 is a block diagram of an alternative decoder according to the present invention, that is, the decoder shown in FIG. 17 is modified to be suitable for multiple layers. A layer number controller 172d is arranged next to an enhancement layer decoding portion 172c, to determine whether supplementary spatial layers need to be restored or not. If additional spatial layers need to be restored, the restored shape data is fed back to an up-sampling portion 172a for SI method, to be referred to in decoding the next enhancement layer. The decoder has the same configuration as that shown in FIG. 17, except the layer number controller 172d. If the enhancement layer to be restored is directly next to the base layer, the base layer is applied to the up-sampling by the up-sampling portion 172a for SI method. Otherwise, the restored shape data of the lower layer directly below the enhancement layer to be restored is applied to up-sampling.

Embodiments of the present invention are shown in Tables 4 through 5.

TABLE 4

Bitstream syntax for this invention [Macroblock Binary Shape Coding]

| mb_binary_shape_coding ( ) { | No. of bits | Mnemonic |
|---|---|---|
| if (!scalability && hierachrchy_type=='0' | | |
|   && (enhancement_type=='0'\|\|use_ref_shape=='0')) | | |
| &&!(scalability | | |
|   && video_object layer_shape=="binary only")){ | | |
|   bab_type | 1–7 | vlclbf |
|   if (vop_coding_type=='P' \|\|vop_coding type=='B' | | |
|   (vop_coding_type=='S'&& sprite_enable=="GMC")){ | | |
|   if (bab_type==1)\|\|(bab type==6)){ | | |
|     mvds_x | 1–18 | vlclbf |
|     mvds_y | 1–18 | vlclbf |

TABLE 4-continued

Bitstream syntax for this invention [Macroblock Binary Shape Coding]

| mb_binary_shape_coding ( ) { | No. of bits | Mnemonic |
|---|---|---|
|   } | | |
| } | | |
| if (bab_type>=4){ | | |
|   if (!change_conv_ratio_disable) | | |
|     conv_ratio | 1–2 | vlclbf |
|   scan_type | 1 | bslbf |
|   binary_arithmetic_code() | | |
|   } else ( | | |
|     if (!use_ref_shape\|\|video_object_layer_shape=="binary only"){ | | |
|     enh_bab_type | 1–3 | vlclbf |
|     if (enh_bab_type==3) | | |
|       scan_type | 1 | bslbf |
|     if (enh_bab_type==1\|\|enh_bab_type==3) | | |
|       enh_binary_arithmetic_code() | | |
|     } | | |
|   } | | |
| } | | |

Table 5. Bitstream semantics for this invention
[Video Object Layer]

video_object_layer_shape: this is a 2-bit integer defined in Table 5-A. It identifies the shape type of a video object layer.

TABLE 5-A

Video Object Layer Shape Type

| Shape format | Meaning |
|---|---|
| 00 | Rectangular |
| 01 | Binary |
| 10 | Binary only |
| 11 | Grayscale | sprite_enable: This is a two-bit unsigned integer which indicates the usage of static sprite coding or global motion compensation (GMC). Table 5-B shows the meaning of various codewords. An S-VOP with sprite_enable=="GMC" is referred to as an S (GMC)-VOP in this document.

TABLE 5-B

Meaning of sprite_enable codewords

| sprite_enable (video_object_layer_verid=='0001') | sprite_enable (video_object_layer_verid=='0002') | Sprite Coding Mode |
|---|---|---|
| 0 | 00 | sprite not used |
| 1 | 01 | static (Basic/Low Latency) |
| — | 10 | GMC (Global Motion Compensation) |
| — | 11 | Reserved | scalability: This is a one-bit flag which when set to '1' indicates that the current layer uses scalable coding. If the current layer is used as base-layer then this flag is set to '0'.

hierarchy_type: The hierarchical relation between the associated hierarchy layer and its hierarchy embedded layer is defined as shown in Table 5-C.

TABLE 5-C

Code Table for hierarchy_type

| Description | Code |
|---|---|
| Spatial Scalability | 0 |
| Temporal Scalability | 1 | enhancement_type: This is a 1-bit flag which is set to '1' when the current layer enhances the partial region of the reference layer. If it is set to '0' then the current layer enhances the entire region of the reference layer. The default value of this flag is '0'.

use_ref_shape: This is one bit flag which indicate procedure to decode binary shape for spatial scalability. If it is set to '0', scalable shape coding should be used. If it is set to '0' and enhancement type is set to '0', no shape data is decoded and up-smapled binary shape of base layer should be used for enhancement layer. If enhancement type is set to '1' and this flag is set to '1', binary shape of enhancement layer should be decoded as the same non-scalable decoding process.

use_ref_texture: When this one bit is set, no update for texture is done. Instead, the available texture in the layer denoted by ref_layer_id will be used.

[Video Object Plane]

vop_coding_type: The vop_coding_type identifies whether a VOP is an intracoded VOP(IP, predictive-coded VOP(P_, bidirectionally predictive-coded VOP (B) or sprite coded VOP (S). The meaning of vop_coding_type is defined in Table 5-D.

TABLE 5-D

Meaning of vop_coding_type

| vop_coding type | Coding method |
|---|---|
| 00 | intra_coded (I) |
| 01 | predictive_coded (P) |
| 10 | bidirectionally_predictive_coded (B) |
| 11 | sprite (S) | change_conv_ratio_disable: This is a 1-bit flag which when set to '1' indicates that conv_ratio is not set at the macroblock layer and is assumed to be 1 for all the macroblocks of the VOP. When set to '0', the conv_ratio is coded at macroblock layer.

5 [MB Binary Shape Coding]

bab_type: This defines the coding type of the current bab.

mvds_x: This defines the size of the x-component of the differential motion vector for the current bab.

mvds_y: This defines the size of the y-component of the differential motion vector for the current bab.

conv_ratio: This defines the upsampling factor to be applied after decoding the current shape information.

scan_type: This defines according to Table 5-E whether the current bordered to be decoded bab and the eventual bordered motion compensated bab need to be transposed.

TABLE 5-E

| scan_type | |
|---|---|
| scan_type | Meaning |
| 0 | transpose bab as in matrix transpose |
| 1 | do not transpose | binary_arithmetic_code( ): This is a binary arithmetic decoder that defines the context dependent arithmetically to be decoded binary shape information. The meaning of the bits is defined by the arithmetic decoder.

enh_bab_type: This defines the coding type of the current bab in the enhancement layer according to Table 1-A and Table 1-C for P-VOP and B-VOP coding, respectively.

enh_binary_arithmetic_code( ): This is a binary arithmetic decoder that defines the context dependent arithmetically to be decoded binary shape information in the enhancement layer. The meaning of the bits is defined by the arithmetic decoder.

As shown in Table 4, in order to decode the shape in the unit of macroblocks, scalability which is a parameter indicating whether the current layer is an enhancement layer or not is defined.

Also, in Table 4, in order to indicate the necessity of decoding the shape data of the current layer, use_ref_shape is defined. If use_ref_shape is "1", the shape of the current layer is not decoded. In this case, the shape data of the reference layer is up-sampled with resolution equal to that of the current layer, thereby restoring the current layer. If use_ref_shape is "0", the shape data of the current layer is decoded.

In order to use the syntax shown in Table 4, it is initially determined whether the current bitstream has a spatial scalable structure for decoding the shape data having a general structure. If the current bitstream has a spatial scalable structure, it is decoded using the hierarchical binary shape encoding method according to the present invention. In the syntax of Table 4, enb_bab_type represents a block coding mode used in the present invention. Also, enb_binary_arithmetic_code ( ) represents a portion for pixel-unit decoding in the case of the intra_coded mode and the inter_coded mode. In this embodiment, there are four block coding modes.

As described above, the algorithm is simplified and system implementation is facilitated, by encoding/decoding the TSD and the ESD with PSD in a single structure in the scan interleaving method of the present invention. Thus, the overall encoding/decoding performance can be improved. In addition, the number of bits depending on scanning direction are compared to then perform decoding in accordance with a scanning direction in which the number of bits is smallest, thus increasing coding efficiency. Further, the encoding/decoding apparatuses according to the present invention are capable of encoding/decoding hierarchical binary shape data, thus increasing coding efficiency.

What is claimed is:

1. A method for encoding binary shape data formed by scalable bitstreams, comprising the steps of:

retrieving a base layer from the current binary shape data;

encoding the base layer by an arbitrary encoding method;

determining whether to encode each of a plurality of portions of an enhancement layer having the current binary shape data based on the base layer or a preceding frame; and encoding each of the plurality of portions of the enhancement layer by referring to the base layer or a preceding frame in accordance with the determination.

2. The binary shape data encoding method as claimed in claim 1, wherein the base layer is obtained by performing down-sampling for scan interleaving (SI) method on the current binary shape data.

3. The binary shape data encoding method as claimed in claim 2, wherein down sampling is done on the binary shape data in the ratio of M/N vertically and in the ratio of m/n horizontally, to obtain the base layer, the down-sampling comprises the steps of:

(1) in down sampling in the ratio of M/N vertically, obtaining the maximum integer K not exceeding $\log_2$ (N/M);

(2) sampling every $2^K$th pixel in the vertical direction;

(3) sampling every N pixels in units of $M2^K$ pixels through predetermined ratio linear sampling, with respect to the sampling result in expression (2);

(4) in down sampling in the ratio of m/n horizontally, obtaining the maximum integer K not exceeding $\log_2$ (n/m), with respect to the sampling result in expression (3);

(5) sampling every $2^K$th pixels in the horizontal direction; and (6) sampling every n pixels in units of $m2^k$ pixels through predetermined ratio linear sampling, with respect to the sampling result in expression (5).

4. The binary shape data encoding method as claimed in claim 1, wherein each of the plurality of portions of the enhancement layer is a block having a predetermined size.

5. The binary shape data encoding method as claimed in claim 4, wherein the determining step determines an encoding mode suitable for each block.

6. The binary shape data encoding method as claimed in claim 5, wherein the block coding mode is one selected from the group consisting of an intra_not_coded mode which is performed by referring to the base layer, without encoding block pixel data, an intra_coded mode which is performed by referring to the base layer, with the block pixel data being encoded, an inter_not_coded mode which is performed by referring to the preceding frame, without encoding block pixel data, and an inter_coded mode which is performed by referring to the preceding frame, with block pixel data being encoded.

7. The binary shape data encoding method as claimed in claim 1, further comprising the step of controlling the number of layers for encoding shape data having a plurality of layers, such that it is determined whether additional spatial layers are necessary, and if necessary, the down-sampled shape data is fed back to the base layer obtaining step.

8. An apparatus for encoding binary shape data comprising:
   a portion for down-sampling for scan interleaving (SI) method, the portion for performing down-sampling for SI method on the binary shape data to form a base layer;
   a portion for encoding the base layer supplied from the down-sampling portion;
   a portion for determining whether to encode each of a plurality of portions of an enhancement layer having the current binary shape data based on the base layer or a preceding frame; and
   a portion for encoding each of the plurality of portions of the enhancement layer by referring to the base layer or a preceding frame in accordance with an output of the portion for determining.

9. The binary shape data encoding apparatus as claimed in claim 8, wherein the base layer obtained by the down-sampling portion consists of only pixels obtaining by sampling pixels in which I and j are both odd numbers, assuming that the horizontal coordinate of the original binary shape is I which is an integer selected from the group consisting of 0, 1, ... and 2n, and the vertical coordinate thereof is j which is an integer selected from the group consisting of 0, 1, ... and 2m.

10. The binary shape data encoding apparatus as claimed in claim 8, wherein the down-sampling portion obtains the base layer by down-sampling the binary shape data in the ratio of M/N vertically and in the ratio of m/n horizontally, by the steps of:
   (1) in down sampling in the ratio of M/N vertically, obtaining the maximum integer K not exceeding $\log_2(N/M)$;
   (2) sampling every $2^K$th pixels in the vertical direction;
   (3) sampling every N pixels in units of $M2^K$ pixels through predetermined ratio linear sampling, with respect to the sampling result in expression (2);
   (4) in down sampling in the ratio of m/n horizontally, obtaining the maximum integer k not exceeding $\log_2(n/m)$, with respect to the sampling result in expression (3);
   (5) sampling every $2^K$th pixels in the horizontal direction; and
   (6) sampling every n pixels in units of $m2^k$ pixels through predetermined ratio linear sampling, with respect to the sampling result in expression (5).

11. The binary shape data encoding apparatus as claimed in claim 8, wherein the enhancement layer encoding portion encodes all pixels contained in the binary shape data or pixels other than the pixels contained in the base layer.

12. The binary shape data encoding apparatus as claimed in claim 8, wherein each of the plurality of portions of the enhancement layer is a block having a predetermined size.

13. The binary shape data encoding apparatus as claimed in claim 12, wherein the enhancement layer encoding portion determines whether the block is a not_coded mode block which can be restored or a coded mode block which needs to be encoded/decoded in units of pixels, by referring to the base layer and the preceding frame, determines whether the base layer or the preceding frame is to be referred to for each of the coded mode and the not_coded mode, and finally encodes one selected from four block coding modes of an inter_coded mode, an inter_not_coded mode, an intra_coded mode and an intra_not_coded mode.

14. The binary shape data encoding apparatus as claimed in claim 13, wherein if the block coding mode of the block to be encoded is an intra_coded mode, the enhancement layer encoding portion performs encoding by a context-based SI encoding method using context values of neighboring pixels, by referring to the base layer.

15. The binary shape data encoding apparatus as claimed in claim 3, wherein if the block coding mode of the block to be encoded is an inter_coded mode, the enhancement layer encoding portion performs context-based arithmetic encoding on all pixels within the block by referring to shape block pixel data obtained from the preceding frame by motion compensation.

16. The binary shape data encoding apparatus as claimed in claim 13, wherein the enhancement layer encoding portion selects one SI scanning direction from V-H SI (Vertical-Horizontal Scan Interleaving) and H-V SI (Horizontal-Vertical Scan Interleaving), performs SI scanning in the selected scanning direction, determines whether there is ESD, if there is ESD in the block, encodes an ESD block ("1") in an enh_block_type mode to then entropy encode all pixels to be scanned, if there is no ESD, encodes a TSD block ("0") in the enh_block_type mode to then entropy encode only pixels corresponding to TSD data among pixels to be scanned.

17. The binary shape data encoding apparatus as claimed in claim 16, wherein the SI block type encoding is performed by dividing an SI block type into a TSD block and an ESD block which are matched to "0" (TSD block) and "1" (ESD block), respectively and then a binary arithmetic encoding is performed thereon.

18. The binary shape data encoding apparatus as claimed in claim 17, wherein the binary arithmetic encoding is performed on the SI block type using a probability table expressed as:
   SI_bab_type_prob[0]={59808}
   SI_bab_type_prob[1]=(65536-59808)
wherein SI_bab_type prob[0] is a probability value when the enh_block_type is "0" for the TSD block, and SI_bab_type_prob[1] is a probability value when the enh_block_type is "1" for the ESD block.

19. The binary shape data encoding apparatus as claimed in claim 18, wherein pixel values of the TSD and ESD blocks are entropy-encoded by obtaining context values by referring to seven neighboring pixel values disposed in a 'c' shape with respect to the respective scanning directions in the V-H SI scanning direction and H-V SI scanning direction and by obtaining probability values that the current pixels occur in the corresponding context, using the context values.

20. The binary shape data encoding apparatus as claimed in claim 19, wherein probability values for entropy encoding the current pixel value corresponding to each context value, in which enh_intra_prob[128] is used for scanned pixels 0 through 63, and enh_intra_h_prob[128] is used for scanned pixels 64 through 191, wherein:

enh_intra_h_prob[128]={
65510, 63321, 63851, 62223, 64959, 62202, 63637, 48019, 57072, 33553, 37041, 9527, 53190,,50479, 54232, 12855, 62779, 63980, 49604, 31847, 57591, 64385, 40657, 8402, 33878, 54743, 17873, 8707, 34470, 54322, 16702, 2192, 58325, 48447, 7345, 31317, 45687, 44236, 16685, 24144, 34327, 18724, 10591, 24965, 9247, 7281, 3144, 5921, 59349, 33539, 11447, 5543, 58082, 48995, 35630, 10653, 7123, 15893, 23830, 800, -continued 3491, 15792, 8930, 905, 65209, 63939; 52634, 62194, 64937, 53948,
60081, 46851, 56157, 50930, 35498, 24655, 56331, 59318, 32209, 6872,
59172, 64273, 46724, 41200, 53619, 59022, 37941, 20529, 55026, 52858,
26402, 45073, 57740, 55485, 20533, 6288, 64286, 55438, 16454, 55656,
61175, 45874, 28536, 53762, 58056, 21895, 5482, 39352, 32635, 21633,
2137,4061, 58490, 14100, 18724, 10461, 53459, 15490, 57992, 15128,
12034, 4340, 6761, 1859, 5794, 6785, 2412, 35};
and wherein:
enh_intra_v_prob[128]={
67476, 64428, 62211, 63560, 52253, 58271, 38098, 31981, 50087, 41042,
54620, 31532, 8382, 10754, 3844, 6917, 63834, 50444, 50140, 63043,
58093, 45146, 36768, 13351, 17594, 28777, 39830, 38719, 9768, 21447,
12340, 9786, 60461, 41489, 27433, 53893, 47246, 11415, 13754, 24965,
51620, 28011, 11973, 29709, 13878, 22794, 24385, 1558, 57065, 41918,
25259, 55117, 48064, 12960, 19929, 5937, 25730, 22366, 5204, 32865,
3415, 14814, 6634, 1155, 64444, 62907, 56337, 63144, 38112, 56527,
40247, 37088, 60326, 45675, 51248, 14141, 18868, 43723, 14757, 11721,
62436, 50971, 51738, 59767, 49927, 50675, 38182, 24724, 48447, 47316,
56628, 36336, 12264, 25893, 24243, 5358, 58717, 56646, 48302, 60515,
36497, 26959, 43579, 40280, 54092, 20741, 10891, 7504, 8019, 30840,
6772, 4090, 59810, 61410, 53216, 64127, 32344, 12462, 23132, 19270,
32232, 24774, 9615, 17750, 1714, 6539, 3237, 152}.

21. The binary shape data encoding apparatus as claimed in claim 19, wherein binary arithmetic encoding is used for entropy encoding the block pixel data.

22. The binary shape data encoding apparatus as claimed in claim 13, wherein in the case of an inter_not_coded mode, the enhancement layer encoding portion uses the motion vector used at the block position of the base layer corresponding to that of the current layer by multiplying vertical and horizontal components of the motion vector by a vertical to horizontal magnification ratio between the enhancement layer and the base layer, in obtaining shape block pixel data from the preceding frame by motion compensation.

23. The binary shape data encoding apparatus as claimed in claim 8, wherein the enhancement layer encoding portion comprises the portion for determining, and the portion for determining comprises:
   a block coding mode determining portion for determining the coding mode of a block being currently encoded;
   a block coding mode encoding portion for variable-length encoding the block coding mode for the current block coding mode by referring to the coding mode of the base layer; and
   a block pixel encoding portion for encoding the block pixel data of the current block by referring to the base layer and the preceding frame in accordance with the block coding mode determined by the block coding mode determining portion.

24. The binary shape data encoding apparatus as claimed in claim 23, further comprising a layer number controller for determining whether additional spatial layers are needed, and if needed, realizing hierarchical shape data encoding, the shape data having an arbitrary number of layers, such that down-sampled shape data is fed back to the down-sampling portion for SI method.

25. A method for decoding binary shape data having a base layer bitstream and an enhancement layer bitstream comprising the steps of:
   decoding the base layer from the base layer bitstream;
   performing up-sampling for scan interleaving (SI) method on the base layer restored in the base layer decoding step;
   decoding an enhancement layer from the enhancement layer bitstream by referring to the base layer or the preceding frame; and
   determining whether restoration of additional spatial layers is necessary, and if necessary, and applying the shape data as restored to the up-sampling step for the purpose of referring to the same in the decoding step of the next enhancement layer.

26. The binary shape data decoding method as claimed in claim 25, further comprising the step of controlling the number of layers for determining whether additional spatial layers need to be restored, and if additional spatial layers need to be restored, feeding back the restored shape data to the up-sampling step, to be referred to in decoding the next enhancement layer.

27. An apparatus for decoding binary shape data having a base layer bitstream and an enhancement layer bitstream, comprising:
   a base layer decoding portion for decoding the base layer from the base layer bitstream;
   an up-sampling portion for performing up-sampling for scan interleaving (SI) method on the base layer restored by the base layer decoding portion; and
   an enhancement layer decoding portion for determining whether to decode each of a plurality of portions of an enhancement layer based on the base layer or a preceding frame, and for decoding each of the plurality of portions of the enhancement layer from the enhancement layer bitstream by referring to the base layer or the preceding frame based on the determination.

28. The binary shape data decoding apparatus as claimed in claim 27, wherein the up-sampling portion obtains the up-sampled image by repeatedly replacing pixel values of pixels at locations $(2i, 2j)$, $(2i-1, 2j)$, $(2i, 2j-1)$ and $(2i-1, 2j-1)$ of the up-sampled image with the same value of a pixel at a location (i, j) of the base layer.

29. The binary shape data decoding apparatus as claimed in claim 27, wherein the enhancement layer decoding portion determines whether each of the plurality of the portions of the enhancement layer is a not_coded mode block which can be restored without decoding using bitstreams or a coded mode block which needs to be decoded in units of pixels, by referring to the base layer and the preceding frame, determines whether the base layer or the preceding frame is to be referred to for each of the coded mode and the not_coded mode, and finally decodes one selected from four block coding modes of an inter_coded mode, an inter_not_coded mode, an intra_coded mode and an intra_not_coded mode.

30. The binary shape data decoding apparatus as claimed in claim 29, wherein the enhancement layer decoding portion decodes the block coding mode of the current block and determines the decoding method of additional data using the same.

31. The binary shape data decoding apparatus as claimed in claim 30, wherein the enhancement layer decoding portion restores the corresponding block by decoding the pixel values except the pixels decoded in the base layer using bitstreams by referring the block which is at the corresponding location of the current block to be decoded from the up-sampled shape data in the case of an intra_coded mode, restores the block of the corresponding location of the current block to be decoded in the case of an intra_not_coded mode, restores the corresponding block by obtaining block pixel data from the preceding frame by motion compensation and performing arithmetic encoding using context values of neighboring pixels by referring to the obtained block pixel data in the case of an inter_coded mode, and restores the current block to be decoded by obtaining block pixel data from the preceding frame by motion compensation in the case of an inter_not_coded mode.

32. The binary shape data decoding apparatus as claimed in claim 31, wherein the enhancement layer decoding portion uses the doubled motion vector of the motion vector used at the block position of the base layer corresponding to that of the current layer as a motion vector by multiplying vertical and horizontal components of the motion vector by a vertical to horizontal magnification ratio between the enhancement layer and base layer, when encoding blocks for the intra_coded mode and the inter_not_coded mode.

33. The binary shape data decoding apparatus as claimed in claim 31, wherein the enhancement layer decoding portion selects one SI scanning direction from V-H SI (Vertical-Horizontal Scan Interleaving) and H-V SI (Horizontal-Vertical Scan Interleaving), and then, if the block to be currently being decoded is a TSD, the enhancement layer decoding portion entropy decodes only the TSD data, and if the SI block is an ESD, the enhancement layer decoding portion decodes entropy decodes all pixels to be scanned.

34. The binary shape data decoding apparatus as claimed in claim 33, wherein the enhancement layer decoding portion decodes the SI block type into a TSD block if the decoded value is "0", and into an ESD block if the decoded value is "1".

35. The binary shape data decoding apparatus as claimed in claim 34, wherein the enhancement layer decoding portion perform restoration by decoding only TSD using bitstreams with respect to a TSD block, decoding the other object pixels to be decoded (scanned) using lower-level pixels (or upper-level pixels) of a scanning direction, and decoding all object pixels to be scanned using bitstreams with respect to an ESD block.

36. The binary shape data decoding apparatus as claimed in claim 35, wherein in order to determine whether an object pixel to be scanned (or decoded) is a TSD or not in the TSD block decoding step, the upper and lower level pixel values of a scanning direction are compared with each other, and, if the pixels values are different from each other, the pixel is determined to be a TSD.

37. The binary shape data decoding apparatus as claimed in claim 31, wherein the enhancement layer decoding portion performs binary arithmetic decoding on the SI block type using a probability table expressed as:

SI_bab_type_prob[0]={59808}

SI_bab_type_prob[1]=(65536-59808)

wherein SI_bab_type_prob[0] is a probability value for the TSD block when the enh_block_type is "0", and SI_bab_type_prob[1] is a probability value for the ESD block when the enh_block_type is "1".

38. The binary shape data decoding apparatus as claimed in claim 37, wherein pixel values of the TSD and ESD blocks are entropy-decoded by obtaining context values by referring to seven neighboring pixel values disposed in a 'c' shape with respect to the respective scanning directions in the V-H SI scanning direction and H-V SI scanning direction and by obtaining probability values that the current pixels occur in the corresponding context, using the context values.

39. The binary shape data decoding apparatus as claimed in claim 38 wherein the enhancement layer decoding portion uses enh_intra_v_prob[128] for scanned pixels 0 through 63 and enh_intra_h_prob[128] for scanned pixels 64 through 191, as probability values for entropy decoding the current pixel value corresponding to each context value, wherein:

enh_intra_h_prob[128]={
65510, 63321, 63851, 62223, 64959, 62202, 63637, 48019, 57072, 33553, 37041, 9527, 53190,,50479, 54232, 12855, 62779, 63980, 49604, 31847, 57591, 64385, 40657, 8402, 33878, 54743, 17873, 8707, 34470, 54322, 16702, 2192, 58325, 48447, 7345, 31317, 45687, 44236, 16685, 24144, 34327, 18724, 10591, 24965, 9247, 7281, 3144, 5921, 59349, 33539, 11447, 5543, 58082, 48995, 35630, 10653, 7123, 15893, 23830, 800, 3491, 15792, 8930, 905, 65209, 63939; 52634, 62194, 64937, 53948, 60081, 46851, 56157, 50930, 35498, 24655, 56331, 59318, 32209, 6872, 59172, 64273, 46724, 41200, 53619, 59022, 37941, 20529, 55026, 52858, 26402, 45073, 57740, 55485, 20533, 6288, 64286, 55438, 16454, 55656, 61175, 45874, 28536, 53762, 58056, 21895, 5482, 39352, 32635, 21633, 2137,4061, 58490, 14100, 18724, 10461, 53459, 15490, 57992, 15128, 12034, 4340, 6761, 1859, 5794, 6785, 2412, 35};
and wherein:
enh_intra_v_prob[128]={
67476, 64428, 62211, 63560, 52253, 58271, 38098, 31981, 50087, 41042, 54620, 31532, 8382, 10754, 3844, 6917, 63834, 50444, 50140, 63043, 58093, 45146, 36768, 13351, 17594, 28777, 39830, 38719, 9768, 21447, 12340, 9786, 60461, 41489, 27433, 53893, 47246, 11415, 13754, 24965, 51620, 28011, 11973, 29709, 13878, 22794, 24385, 1558, 57065, 41918, 25259, 55117, 48064, 12960, 19929, 5937, 25730, 22366, 5204, 32865, 3415, 14814, 6634, 1155, 64444, 62907, 56337, 63144, 38112, 56527, 40247, 37088, 60326, 45675, 51248, 14141, 18868, 43723, 14757, 11721, 62436, 50971, 51738, 59767, 49927, 50675, 38182, 24724, 48447, 47316, 56628, 36336, 12264, 25893, 24243, 5358, 58717, 56646, 48302, 60515, 36497, 26959, 43579, 40280, 54092, 20741, 10891, 7504, 8019, 30840, 6772, 4090, 59810, 61410, 53216, 64127, 32344, 12462, 23132, 19270, 32232, 24774, 9615, 17750, 1714, 6539, 3237, 152}.

40. The binary shape data decoding apparatus as claimed in claim 37, wherein the enhancement layer decoding portion performs binary arithmetic decoding for entropy-decoding the pixel data of the current block to be decoded.

41. The binary shape data decoding apparatus as claimed in claim 27, further comprising a layer number controller for determining whether additional spatial layers are needed, and if needed, applying the restored shape data having an arbitrary number of layers as needed to the up-sampling portion for SI decoding to be referred to when decoding the next enhancement layer.

* * * * *